US011165522B2

(12) United States Patent
Svennebring et al.

(10) Patent No.: US 11,165,522 B2
(45) Date of Patent: Nov. 2, 2021

(54) RADIO LINK QUALITY PREDICTION

(71) Applicant: Intel Corporation, Santa Clara, CA (US)

(72) Inventors: Jonas Svennebring, Sollentuna (SE); Bjorn Topel, Järfä lla (SE); Katalin Bartfai-Walcott, El Dorado Hills, CA (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/857,123

(22) Filed: Dec. 28, 2017

(65) Prior Publication Data
US 2019/0036630 A1 Jan. 31, 2019

Related U.S. Application Data

(60) Provisional application No. 62/571,602, filed on Oct. 12, 2017.

(51) Int. Cl.
*H04B 17/373* (2015.01)
*H04W 64/00* (2009.01)
*H04W 4/02* (2018.01)
*H04W 40/12* (2009.01)
*H04W 28/02* (2009.01)
*H04W 4/029* (2018.01)

(52) U.S. Cl.
CPC ......... *H04B 17/373* (2015.01); *H04W 4/025* (2013.01); *H04W 40/12* (2013.01); *H04W 64/006* (2013.01); *H04W 4/029* (2018.02); *H04W 28/0226* (2013.01); *H04W 28/0236* (2013.01); *H04W 64/003* (2013.01)

(58) Field of Classification Search
None
See application file for complete search history.

(56) References Cited

U.S. PATENT DOCUMENTS

| 8,239,911 B1* | 8/2012 | Sun ................. H04N 21/41422 725/118 |
| 2011/0274099 A1 | 11/2011 | Kwon et al. |
| 2011/0300807 A1* | 12/2011 | Kwun .................. H04W 24/10 455/63.1 |

(Continued)

FOREIGN PATENT DOCUMENTS

| WO | WO-2014008476 A1 | 1/2014 |
| WO | 2019074640 | 4/2019 |

OTHER PUBLICATIONS

"International Application Serial No. PCT/US2018/051908, International Search Report dated Jan. 18, 2019", 4 pgs.
"International Application Serial No. PCT/US2018/051908, Written Opinion dated Jan. 18, 2019", 6 pgs.

(Continued)

*Primary Examiner* — Saad Khawar
(74) *Attorney, Agent, or Firm* — Schwegman Lundberg & Woessner, P.A.

(57) ABSTRACT

System and techniques for radio link quality prediction are described herein. A mobile device may receive a device registration. Motion data for the mobile device may then be obtained. A predicted path for the mobile device may be derived from the motion data. A set of predicted radio metrics for the mobile device along the predicted path mat be produced via a dynamic coverage map. The set of predicted radio metrics may then be transmitted.

24 Claims, 13 Drawing Sheets

(56) References Cited

U.S. PATENT DOCUMENTS

| | | | | |
|---|---|---|---|---|
| 2014/0200036 A1* | 7/2014 | Egner | .................. | H04W 64/00 |
| | | | | 455/456.3 |
| 2014/0378141 A1* | 12/2014 | Walley | ................ | H04W 36/023 |
| | | | | 455/437 |
| 2015/0049602 A1* | 2/2015 | Gavita | .............. | H04W 28/0268 |
| | | | | 370/229 |
| 2016/0165548 A1 | 6/2016 | Mohlmann et al. | | |
| 2016/0345143 A1* | 11/2016 | Kwan | .................. | H04M 3/537 |
| 2016/0380820 A1 | 12/2016 | Horvitz et al. | | |
| 2017/0219356 A1* | 8/2017 | Murayama | ......... | G01C 21/3697 |
| 2017/0318450 A1* | 11/2017 | Salkintzis | ............. | H04W 60/04 |
| 2017/0346775 A1* | 11/2017 | Liu | ......................... | H04L 51/20 |
| 2019/0387426 A1* | 12/2019 | Lee | ......................... | H04L 65/80 |

OTHER PUBLICATIONS

Bui, Nicola, "A Survey of Anticipatory Mobile Networking: Context-Based Classification, Prediction Methodologies, and Optimization Techniques", IEEE, 31 pgs.

Gaertner, Gregor, "Link Quality Prediction in Mobile Ad-Hoc Networks", Chapter 4 of Link Quality Prediction in Mobile Ad-Hoc Networks,Foundation of Cognitive Radio Systems, Prof. Samuel Cheng (Ed.), ISBN: 978-953-51-0268-7, InTech,, (2012), 35 pgs.

Sayeed, Zulfiquar, "Cloud Analytics for Wireless Metric Prediction—Framework and Performance", 2015 IEEE 8th International Conference on Cloud Computing, (2015), 995-998.

"International Application Serial No. PCT US2018 051908, International Preliminary Report on Patentability dated Apr. 23, 2020", 8 pgs.

* cited by examiner

RADIO LINK QUALITY PREDICTION

PRIORITY APPLICATION

This application claims the benefit of priority to U.S. Provisional Application Ser. No. 62/571,602, filed Oct. 12, 2017, which is incorporated herein by reference in its entirety.

TECHNICAL FIELD

Embodiments described herein generally relate to radio communications and more specifically to radio link quality prediction.

BACKGROUND

The third generation partnership project (3GPP) maintains development of cellular standards. The classification of cellular networks into capabilities has progressed for some time, starting with second generation (2G), through 3G, 4G, and now the development of 5G cellular networks. The cellular standards cover many aspects of operation, such as radio parameters (e.g., frequency, encoding, timing, frame design, etc.), user equipment (UE) parameters, and network parameters (e.g., cellular network protocols, entities, etc.). The standards facilitate construction of UEs and radio stations (e.g., base stations, access points, enhanced Node Bs or eNBs, etc.) to permit modern wireless communication.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
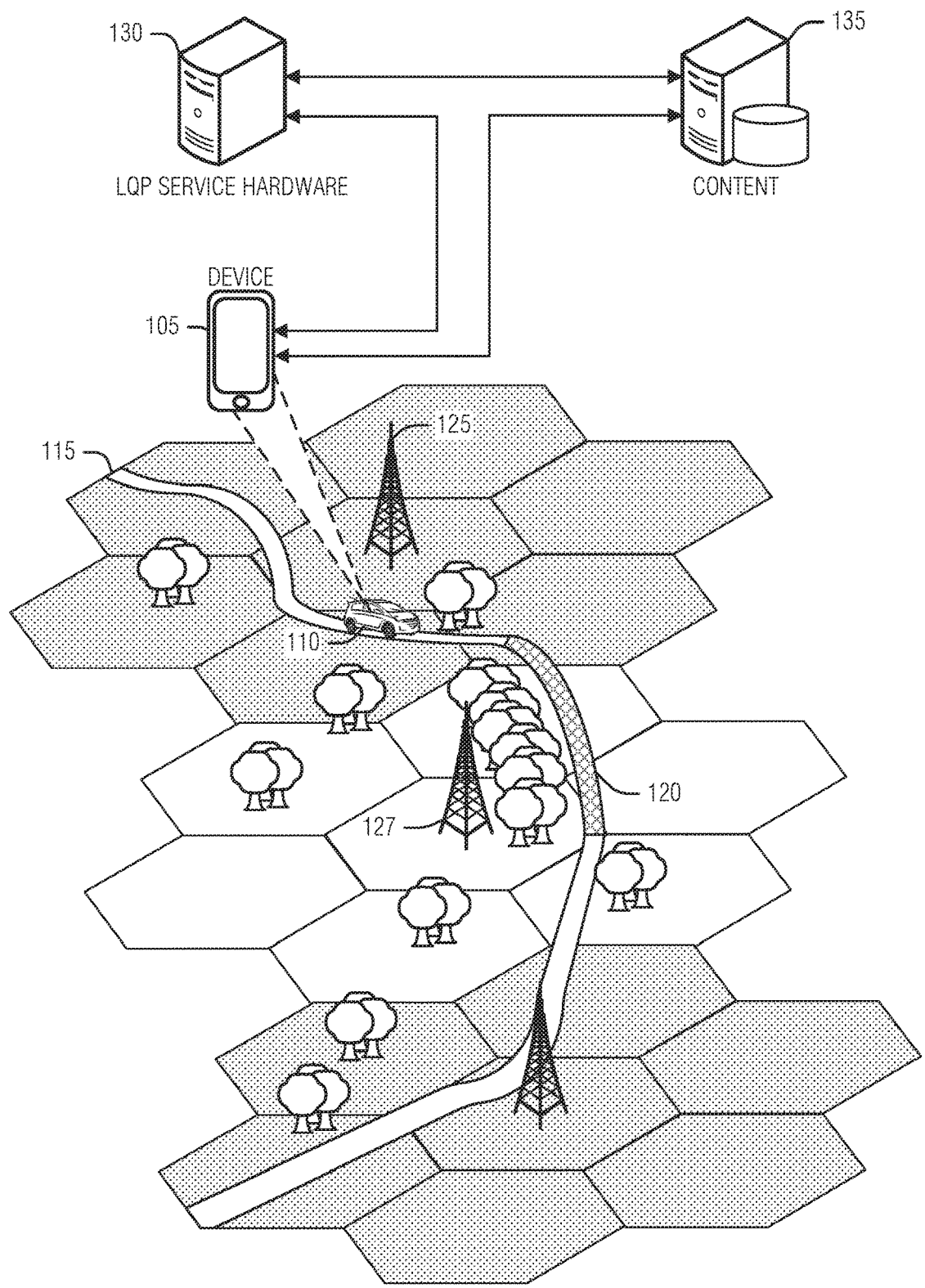
FIG. 1 illustrates an environment including a device for radio link quality prediction, according to an embodiment.

More and more, application data, rather than voice, is becoming the load of cellular networks. With more recent cellular networks, such as 4G and 5G, a variety of techniques have been, or are planned to be, employed to increase data throughput. A number of these techniques, such as ultra-wideband, femto-cells, or high order (e.g., greater than 256 bit) quadrature amplitude modulation (QAM) are effective in certain circumstances (e.g., at close ranges, with little radio interference, etc.) and not in others. Thus, a wireless connection may significantly shift its performance as a client moves relative to a base station. This may make it difficult for endpoints (e.g., UE, client, or server) to determine when transmission conditions are good and what to expect from the connection in the near, or mid-term future.

The lack of future connectivity information may result in sub-optimal end-to-end experiences because services, such as streaming a video, may be interrupted as the link quality degrades, whereas a better understanding of current and future link quality would have allowed the endpoints to make smarter transmission decisions, such as extra buffering the video prior to leaving an area with good coverage. Other examples may include: uploading photos when transmission is power efficient power to save energy for battery operations devices; notifying interrupted communication partners before the interruption occurs or when it will be reestablished; etc. In addition, short-range-high-bandwidth cells may be difficult to fully utilize because the endpoints has little time to discover and react to the presence of a cell. For example, a client in a car, train, or subway may only stay in a given 5G cell for a few seconds while traveling.

Wireless systems may include metrics for current or near-term transmission quality. For example, 3GPP based systems may use channel quality indicator (CQI) reports for this purpose. Data (e.g., packets) are transmitted over a lurk (e.g., physical wired or wireless link) and measured to determine link characteristics, such as bandwidth, latency, error rates, etc. For TCP/IP based connections, there is a basic adaptation included in the TCP protocol with the congestion/receive-window functionality. This functionality is relatively slow in adapting to link changes and fits poorly with cellular transmission behaviors. Many services, including content streaming, rely on UDP as a carrier, which does not have the TCP/IP congestion functionality. Close-range wireless (e.g., networks that conform to an IEEE 802.11 family of standards) clients or mobile handsets operating on a close-range wireless network are able to read access point signal strength. This may be used to make transmission decisions. However, signal strength, much like CQI, only provides current air-interface connection information and does not help to avoid future connectivity issues should the client, for example, be moving. These techniques, however, do not provide endpoints with the information needed to modify endpoint behavior to enhance user experience because, generally, they miss future transmissions or radio link quality.

To address this problem, a more long-term radio link quality prediction technique is needed. For example, CQI reports, or the like, may be combined with coverage maps, information about UE motion, environmental conditions (e.g., the weather, traffic, etc.) to provide a more comprehensive farseeing outline of radio link quality for endpoints. This data may be processed with data mining, artificial intelligence (AI), or machine learning (ML) to enable prediction of individual client connectivity based on various surrounding parameters, e.g. local/regional infrastructure state, infrastructure layout vs. physical environment (road, subway, waterway, . . . ), client usage behavior, or the like.

A Link Quality Prediction Protocol (LQPP) may be used to setup and manage link quality prediction (LQP) information to endpoints. In an example, the LQPP is based on a server that gathers available data from a network infrastructure as well as client motion data or other environmental data, processes this information, and makes predictions on radio link performance for a device. The described techniques are not limited to a cellular network, but are useful for a variety of networks in which different known links may be used at different times by a client device. Once the future link information is ascertained, the endpoints may change their behavior to enhance user experiences. For example, a client or a server may employ more aggressive video buffering when bandwidth will decrease. Thus, an additional buffer of more than N seconds may be requested or sent if it is likely that a current connection will degrade for N seconds the in near future. in another example, non-real-time applications may be modified to save power by considering optimal transmission power locations. Such considerations may involve sending larger synchronizing files, performing backups, etc., at time when transmission power requirements are low. In another example, real-time applications, such as phone calls or video conference calls, may indicate when a participant is about to lose connectivity or give an estimation when connectivity will be restored when future link quality is shared with either the client or the provider. Thus, rather than simply dropping a call when a UE enters a tunnel, the cellular provider may step in and inform the listener that "Peter is expected to be reconnected in 5 . . . 4 . . . 3 . . . 2 . . . 1 . . . " followed by the call resuming.

The usefulness of radio link quality prediction may be generalized to adapting service level agreements (SLAs) of services to predictable future conditions. Internet of Things (IoT), Fog computing, edge computing (including mobile edge computing (MEC) have driven connectivity and network technology evolution to run with diverse services having different requirements for SLAs based on, for example, application types (e.g., real-time vs. non-real-time, entertainment vs. mission-critical, etc.). The radio technologies have evolved to address the largely horizontal application of diverse IoT segments (e.g., industrial, automotive, transportation, e-health, smart cities, etc.), that are developed in silos where each network technology is evolving on its own and within its standard body and service platforms. These siloed approaches have focused on optimizing data transmission from the edge to the cloud. Often, when an SLA is established, it is based on an assumed optimum connectivity for each service. Thus, attenuation in connectivity (e.g., reduction in link quality) may impact service SLAs. Thus, the model of set SLAs based on strict performance of variable radio links does not scale given the numerous connectivity technologies, the mobility of connected devices—e.g., connected vehicles, connected drones or even a wearable device that is mobile with its holder, and the unpredictability of implementations, use cases, and unforeseen circumstances in operation. Even though, cellular technology that has broad coverage, the coverage and signal strength varies within each cell due to particular technology employed, traffic, weather, terrain, etc. This may lead to inconsistent connectivity by services, impacting service SLA.

By employing radio link quality prediction as outline herein, problems due to service attenuation resulting from variable and unpredictable coverage, signal strength, or link quality variation may be managed. This allows proper allocation of resources to maintain SLAs, and may also enable a service prediction model to forecast the rate of termination of the SLA for a given service. Additional details and examples are provided below.

FIG. 1 illustrates an environment including a device for radio link quality prediction, according to an embodiment. LQP analysis may be accomplished by creating a temporal and spatial radio coverage map of the environment. This map provides estimated radio communication metrics for devices at a given space and time. The temporal considerations address usage or interference patterns due to weekdays, weekends, patterns in individual weekdays, seasons, special occasions, current traffic conditions, abnormal conditions (e.g., weather, a fire, etc. that may impact coverage), among others.

The spatial-temporal coverage map may be created by combining data from the network provider (e.g., base stations 125 or 127) to modify coverage based on locations, type (e.g., 4G vs 5G), or real-time load. The coverage map may also be updated through field measurements, for example, via device 105 reporting (e.g., a LQPP feedback loop in which the device 105 compares a predicted radio metric with a measured radio metric and reports the difference to the LQP service hardware 130). For example, Radio metric measurements may include radio signal level (dBm) or Signal to Noise Ratio (SNR) sampling. The sampling may be conducted per base station and correlated with, for example, bandwidth measurements at specific locations. The analysis may be performed using machine learning regression models, such as gradient descent or regularization, artificial neural networks, or the like. This allows for the map to estimate throughput in bandwidth for a given location at a given time.

The coverage map may be used to predict throughput (or other radio characteristics such as latency) at a given geographical position. This may be combined with device motion prediction to identify likely future positions of the device 105, and thus predict radio link quality for the device 105. Motion prediction may include individual user spatial temporal patterns, use class patterns (e.g., commuter, salesperson, youth, retired person, etc.), or group patterns (e.g., members of a family, members of a team, co-workers, etc.) over a graph (e.g., linked vertices, such as road segments linking intersections, trails, subways, railways, waterways, airways, etc.). The graph encompasses possible motions (e.g., routes). Paths from a vertex may he weighted with a probability, based on the motion prediction, that the device 105 will traverse a path. The probability may be based on an individual's motion history, or, for a group or class of users, based on a proportion of members of the group or class that have taken a given path at a given set of temporal parameters (e.g., at a given day, at a given time, at a given season, at a given holiday, etc.). The historical data may be combined with real-time motion data information, such as traffic, construction, etc. to identify traversal rates or landmark acquisition (e.g., at what time will the device 105 pass landmark A). This completed motion data with the radio coverage map allows a prediction of radio link quality for the device 105 as it moves along. Again, a variety of machine learning techniques may be used to provide the probabilities from the historical or proportional motion data.

To implement the above, a device 105 is communicatively coupled, when in operation, with an LQP service hardware 130 and possibly a content provider 135. Each of these entities are implemented in electronic hardware (e.g., processing circuitry). The LQP service hardware 130 is arranged to receive a device registration for the device 105 (e.g., a mobile device such as a vehicle system, mobile phone, tablet, battery operated computer, etc.). The registration makes the LQP service hardware 130 aware of the device 105 and able to integrate motion data for link quality predictions. In an example, receiving the device registration includes receiving a device contact, creating a device record in response to the device contact, creating an identifier for the device record, and transmitting the identifier to the device 105 to complete the registration. In an example, the identifier is anonymized. Here, the identifier may be a hash, key, or other token that uniquely identifies the device 105 without revealing details of the device 105. As discussed below, this allows the content provider 135 to tailor its activities based on link quality predictions for the device 105 without compromising the privacy of a user operating the device 105.

The LQP service hardware 130 is arranged to obtain (e.g., retrieve or receive) motion data for the device 105. In an example, the LQP service hardware 130 obtains the motion data via a status update from the device 105. In an example, the motion data is obtained from a cellular network update that concerns the device 105. In an example, the status update includes a geographic coordinate obtained from at least one of a satellite positioning service (e.g., global positioning system, GLONASS, Galileo, etc.) or a network location service (e.g., services that operate via signal trilateration, proximity to transceivers, or the like). Thus, the motion data of the device 105 traveling in a vehicle 110 may be tracked or obtained from the device 105, or from a base station 125, and sent to the LQP service hardware 130.

The LQP service hardware 130 is arranged to produce a predicted path for the device 105. As illustrated in FIG. 1, there is a single route (e.g., road 115) and thus the prediction will likely entail the device 105 continuing to travel on the road 115. The predicted path may also include timing, such that the time at which the vehicle 110 traverse a given segment of the road 115, such as the segment 120. However, in many cases, there will be multiple routes available to the vehicle 110. Thus, in an example, producing the predicted path includes obtaining a set of routes and matching the device 105 to a subset of routes in the set of routes based on the motion data. In an example, matching the device 105 to the subset of routes includes providing a trained classifier a set of environmental conditions and the motion data. Output of the trained classifier (e.g., statistical regression, artificial neural network, etc.) may then be used to identify the subset of routes. In an example, the environmental data includes the set of routes and at least one of weather, a construction notification, or a traffic notification.

In an example, the trained classifier is at least one of an artificial neural network or an expert system. In an example, the output of the trained classifier is a probability for each route in the set of routes. In an example, using the output of the trained classifier to identify the subset of routes includes selecting each route with a probability greater than a threshold in the subset of routes. In an example, using the output of the trained classifier to identify the subset of routes includes selecting a fixed number of routes with the greatest probabilities to be the subset of routes. The use of the classifier allows a large number of factors to be consumed, the classifier weighting or eliminating the factors to produce a likely outcome for a given itinerary of the vehicle 110 or the device 105. This technique is advantageous over simply matching a GPS coordinate of the device 105 to the road 115 when a number of competing factors such as construction, traffic, multiple routes, etc.—influence user behavior in picking a particular route. A further advantage to classifiers is the ability to modify the classifier with additional training data. Generally, additional training data is integrated into a classifier to gracefully move the classifier's output based on current data. Thus, the device 105 may have received a prediction, measured the reality at the point of the prediction (e.g., at the time the prediction was to happen) and provide a delta between the two data points. This delta may then be used as additional training to the classifier, improving future predictions.

Once the subset of routes are produced, the LQP service hardware 130 may order the subset of routes. The highest order route may be selected from the subset of routes as the predicted path. While other techniques may be employed to implement variety (e.g., one of a top five routes is randomly selected) to mitigate various issues, selecting the highest order route often provides a simple effective selection mechanism.

The LQP service hardware 130 is arranged to produce a set of predicted radio metrics the device 105 along the predicted path via a dynamic coverage map. In an example, a radio metric in the set of predicted radio metrics is at least one of a bandwidth, latency, transmission power, or available link technology. Thus, the motion data provides an indication of time and place that the device 105 will be. The dynamic coverage map provides a radio metric at a future time and location. The times and positions of the device 105 and the coverage map are correlated and the set of radio metrics corresponding to the time and place are the set of predicted radio metrics at a point along the predicted path. Radio metrics for additional points may be added to the set of predicted radio metrics for the device 105.

The LQP service hardware 130 may be arranged to create the dynamic coverage map, or another entity may create the map. To create the dynamic coverage map, a base map may be obtained. The base map may include terrain features, route features (e.g., roads, waterways, etc.), radio network entity locations (e.g., base stations 125 or 127), etc. The base map may be modified into a coverage map with radio coverage information for the radio network entities. Such coverage information may include predicted radio coverage when a cell was installed, ongoing diagnostic by the service provider, etc. This coverage map may then be updated (e.g., kept current) with real-time environmental data (e.g., CQI reports, traffic, weather, LQP feedback, etc.) to create the dynamic coverage map.

In an example, the set of predicted radio metrics along the predicted path may be produced by demarcating radio transmission areas along the predicted path using the dynamic coverage map. As illustrated in FIG. 1, these radio transmission areas are the hexagonal cells surrounding a base station (the top and bottom cells shaded to distinguish from the cell of base station 127). The predicted path may be segmented using the radio transmission areas. Here, segment 120 is in the transmission area of base station 127. The segment 120 has different radio metrics than other segments due to the terrain blocking effect of trees between the base station 127 and the road 115. A member for the set of predicted radio metrics, obtained from the dynamic coverage map, is then created the segment (or for every segment).

The members of the set of predicted radio metrics include a transition metric. In an example, the transition metric is at least one of a begin time or an end time. In an example, the transition metric is a geographic coordinate. Thus, the transmission metric for the segment 120 may include both the geographic location of the ends of the segment 120, but also the time the vehicle 110 is expected to reach those geographical locations.

Once the link quality predictions are generated (e.g., the set of predicted radio metrics), they may be transmitted (e.g., to the device or to another entity such as a content provider). The recipient of the predictions may use the link quality forecast to modify behavior in light of the forecast. For example, the device 105 may delay downloading large tiles because a more energy efficient link is shortly expected. In an example, the content provider 135 may pause a game in anticipation of link quality degradation for the device 105. Thus, either the device 105 or the content provider 135 may communicate with the LQP service hardware 130 and individually modify their behavior, or coordinate behavior modification via communications that do not go through the LQP service hardware 130.

Although illustrated as separate from the device 105, in an example, the LQP service hardware 130 may be integrated into the device 105. As illustrated in the example of HG. 1, the LQP service hardware 130 is remote from the device 105. Being remote means that a communications network external to the housing of either the device 105 or the LQP service hardware 130 is used to transfer information between these devices. In an example, the device 105 communicates with the LQP service hardware 130 using an LQP protocol. In an example, the LQP protocol includes a time synchronization between the LQP service hardware 130 and the device 105. In an example, the LQP protocol includes a request-response communication paradigm, which may be referred to as polling. In an example, the LQP protocol includes a publish-subscribe communication protocol. In an example, the device 105 subscribes to the set of predicted radio metrics and the LQP service hardware 130 pushes the set of predicted radio metrics to the device 105 when there is a change in the set of predicted radio metrics.

In an example, the device 105 uses the set of predicted radio metrics to modify its behavior. In an example, modifying its behavior includes at least one of notifying a user that coverage will cease before coverage ceases, or notifying a user that coverage will resume before coverage resumes. In an example, modifying its behavior includes requesting the content provider 135 to send more data than is currently being sent in anticipation of a coverage degradation or to hold off sending data in anticipation of coverage getting better (e.g., better bandwidth, more energy efficient, etc.). In an example, modifying its behavior includes gracefully shutting down network services in anticipation of coverage degradation. This last example allows, for example, data base connections to be closed, files to be saved, etc. preventing data corruption or adverse consequence from coverage degradation.

The discussion of the dynamic coverage map and the LQP service hardware 130 above suggest a continuous radio link quality estimation across a given geographical area. However, a more coarse grained approach may be implemented. In this approach, radio link quality may be measured as attenuation anchored at a given service controller, such as base station 127. Attenuation markers may demarcate gross variance in radio link quality from the service controller and be used to predict radio link quality transitions for the device 105. In these examples, the LQP service hardware 130 may be referred to as an attenuation controller. In an example, the attenuation controller establishes an inner and an outer marker for a radio coverage area. In an example, a radio device at the inner marker has better coverage than at the outer marker. In an example, the attenuation controller provides a trigger to at least one of a service adapter or a connectivity adapter (described below) in response to the mobile device crossing the inner marker or the outer marker.

in an example, the attenuation controller receives radio network data from a connectivity-network access tracker. In an example, the connectivity-network access tracker receives raw radio network data from a network scanner. The scanner may be at a base station, or within the wireless provider's network. In an example, the attenuation controller receives service data from a service type and quality tracker. Here, the service data includes information about a service level agreement (SLA) for the service. For example, the service provider 135 may provide a telephony service SLA with a 128 kilobytes per second bandwidth. As the device moves away from the base station 127, and crosses a first attenuation marker, the service provider 135 may assume that the second attenuation marker may be passed in the future. The coverage beyond the second attenuation marker may not permit the telephony SLA to be met (e.g., the bandwidth will drop). The service provider 135 may then signal the device 105 of the impending SLA violation and take remedial action (e.g., notifying the user that a call will be interrupted, allowing the user to make their goodbyes).

In an example, the attenuation controller provides attenuation output to a connectivity adaptor. In an example, the connectivity adaptor provides horizontal or vertical roaming. Here, the impending violation of an SLA may he mitigated by moving the device's connection to another service controller (e.g., another base station), or different service (e.g., switch to a satellite communication network, IEEE 802.11 network, etc.).

In an example, the attenuation controller provides attenuation output to a service adaptor. In an example, the service adaptor controls a service to at least one of pause or stop. Here, the impending violation of the SLA may be handled more gracefully than expected service interruptions by notifying the user to take remedial actions (e.g., ending a call), closing open connections, etc. The service adaptor may communicate or control the graceful interruption of services from the device 105, or by communicating with the service provider 135 directly.

Figure 2:
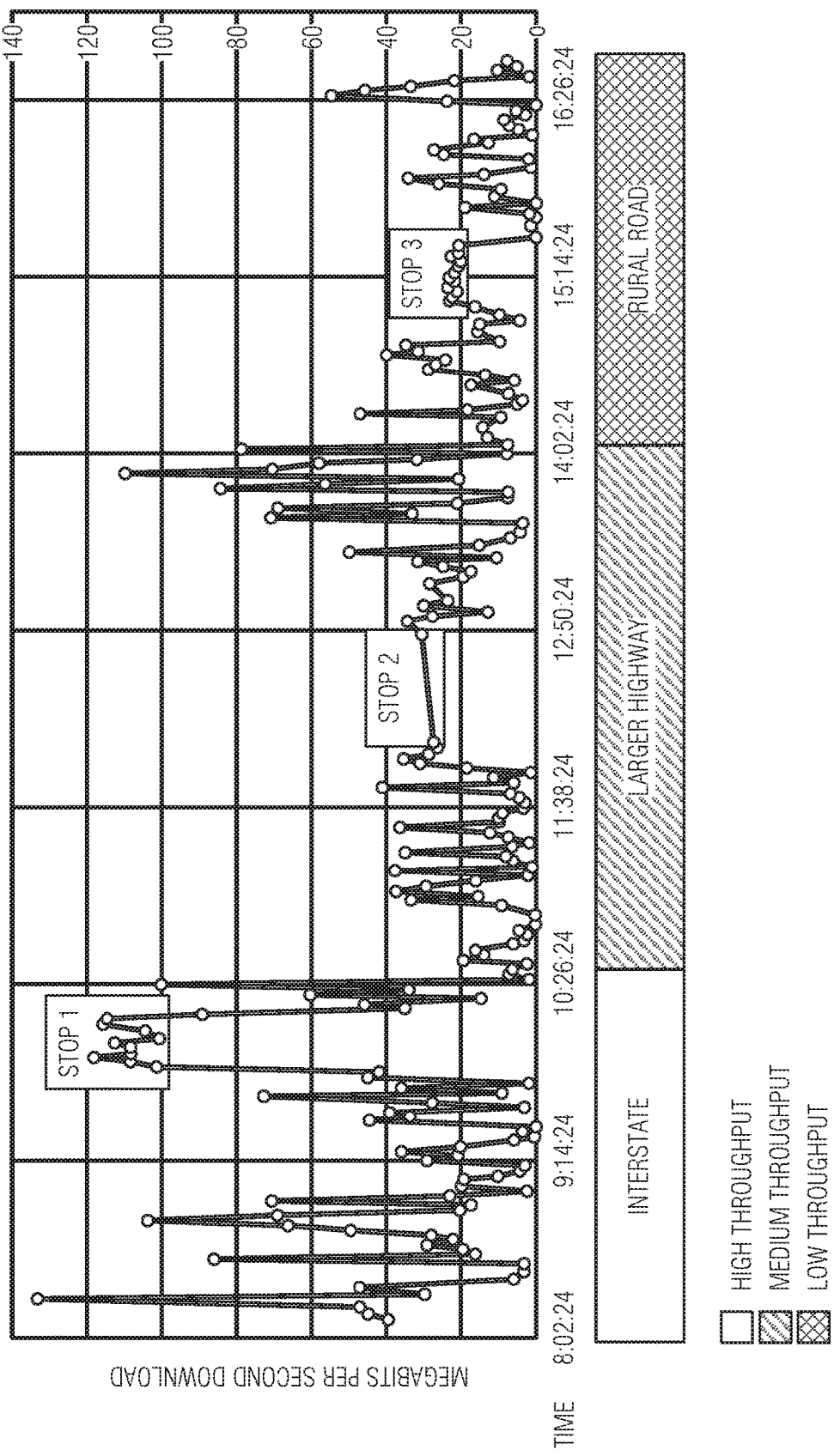
FIG. 2 illustrates an example of radio link quality while traveling, according to an embodiment.

FIG. 2 illustrates an example of radio link quality while traveling. The plot illustrates that, although 5G cells may have high throughput, they may also have limited physical coverage. This leads to a dynamic link quality profile when traveling.

Figure 3:
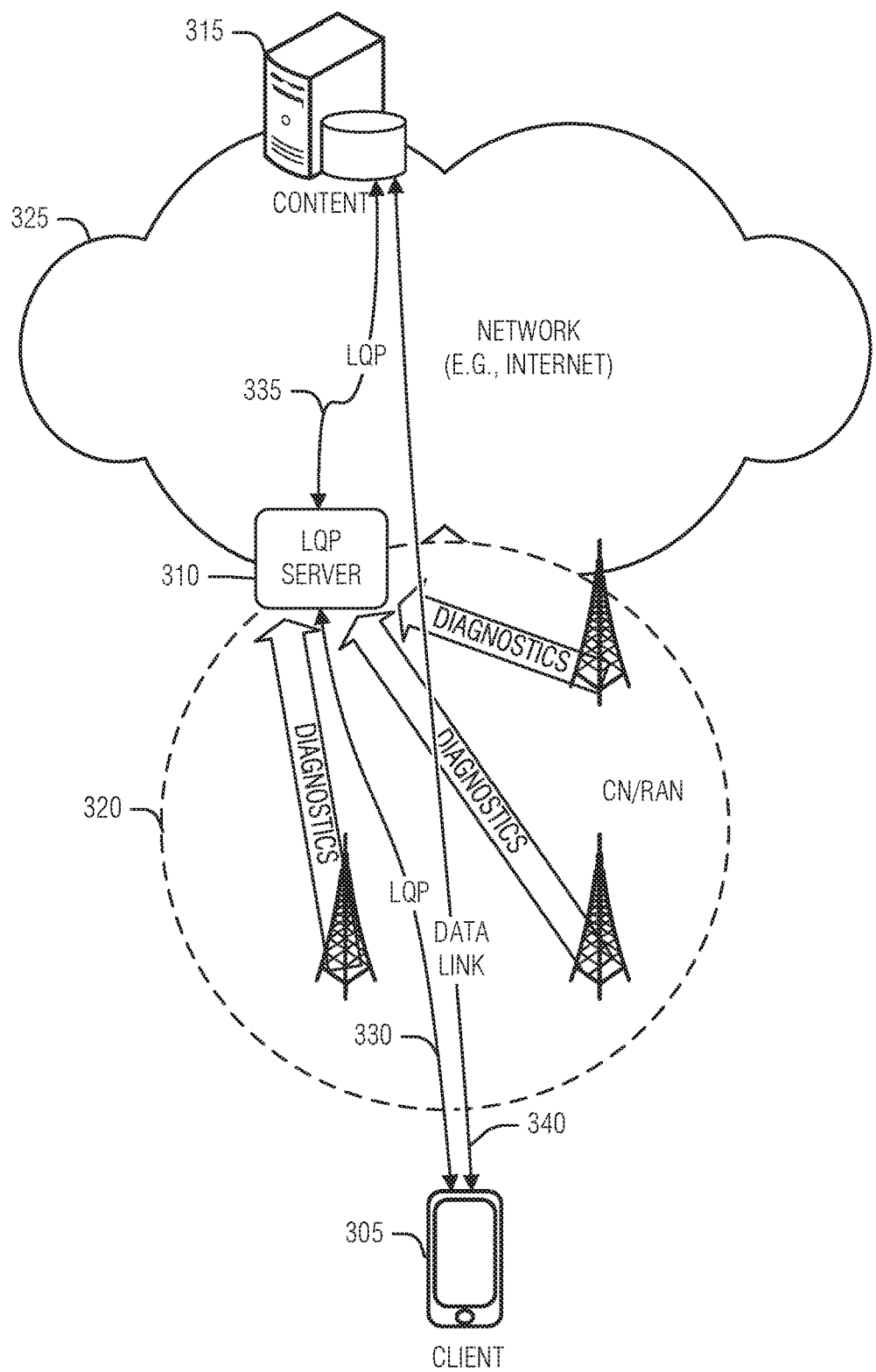
FIG. 3 illustrates an example of a system for radio link quality prediction, according to an embodiment.

FIG. 3 illustrates an example of a system for radio link quality prediction, according to an embodiment. The LQPP server 310 may be a publically accessible (e.g., addressable whether or not authentication is required) server—such as a network 325 (e.g., the Internet) accessible service, similar to e.g. HTTP, SMTP servers. The LQPP server 310 handles LQP for clients 305 (e.g., UEs) connected with the service provider 315. Participants connect to the LQPP server 310 with the LQP link 330 in the case of the clients 305, and LQP link 335 in the case of the service provider 315. The client 305 is identified in LQP activities by a key—which may be provided to the service provider 315 by the client 305 via sideband communication path 340—allowing the service provider 315 to monitor the LQPs for the client 305 and radio network 320. The client is also able to request LQPs from the LQP server 310. The LQP server 310 uses diagnostics from the network 370 to make the LQPs.

Thus, the LQPP server 310 gathers infrastructure information from the infrastructure 320—e.g., in the case of 3GPP based networks this could include radio access network (RAN) such as base stations, gateways, routers, switches, etc., in the data path as well as user information from the subscriber database (HLR), operational support systems (OSS), business support systems (BSS), information about the environment (e.g., roads, terrain, vegetation, etc.)—that impacts the air interface or how the client 305 moves. This information may contain node load levels (e.g., how many clients are serviced by a particular base station) to determine if there is congestion, or to determine physical location of nodes to ascertain signal strength to base station, or distance or latency between nodes. The information gathered is processed by the LQPP server 310 using one or more different techniques that may include artificial intelligence or machine learning based approaches to account for and learn user behaviors. These behaviors may include workday patterns, weekend patterns, when and where rush hour traffic occurs and how it affects radio link quality. The techniques themselves may be of differing complexities and take different types of data into consideration.

Accounting for future radio link quality provides a number of advantages to current systems and techniques. For example, a variety of application areas may increase user experiences. Streaming movie services may adapt streaming buffers to cover for poor coverage areas. Real time connections, such as telephony or video conferencing, may provide notification on when a connection will be lost, or how long until it may reconnect. Data transfers (e.g., backups, image downloads, etc.) may be performed in a power efficient manner by waiting until lower transmit powers are needed. Awareness of what radio access technology (RAT) is available and when may also provide power savings or enhanced capabilities.

The benefits may also be used to tune network stacks (e.g., modifying transmission control protocol (TCP) window handling), to pre-fetch data to nodes in network—e.g. send data to a base station with high-bandwidth air interface in anticipation of the device 305 receiving the data from that base station, or routing self-driving cars in order to maintain a certain connection quality (e.g., to ensure the availability of video conferencing enroute).

These benefits inure to UE users and suppliers by producing a better user experience and to service providers by increased perceived performance at lower costs, or more fully utilizing a network.

Figure 4:
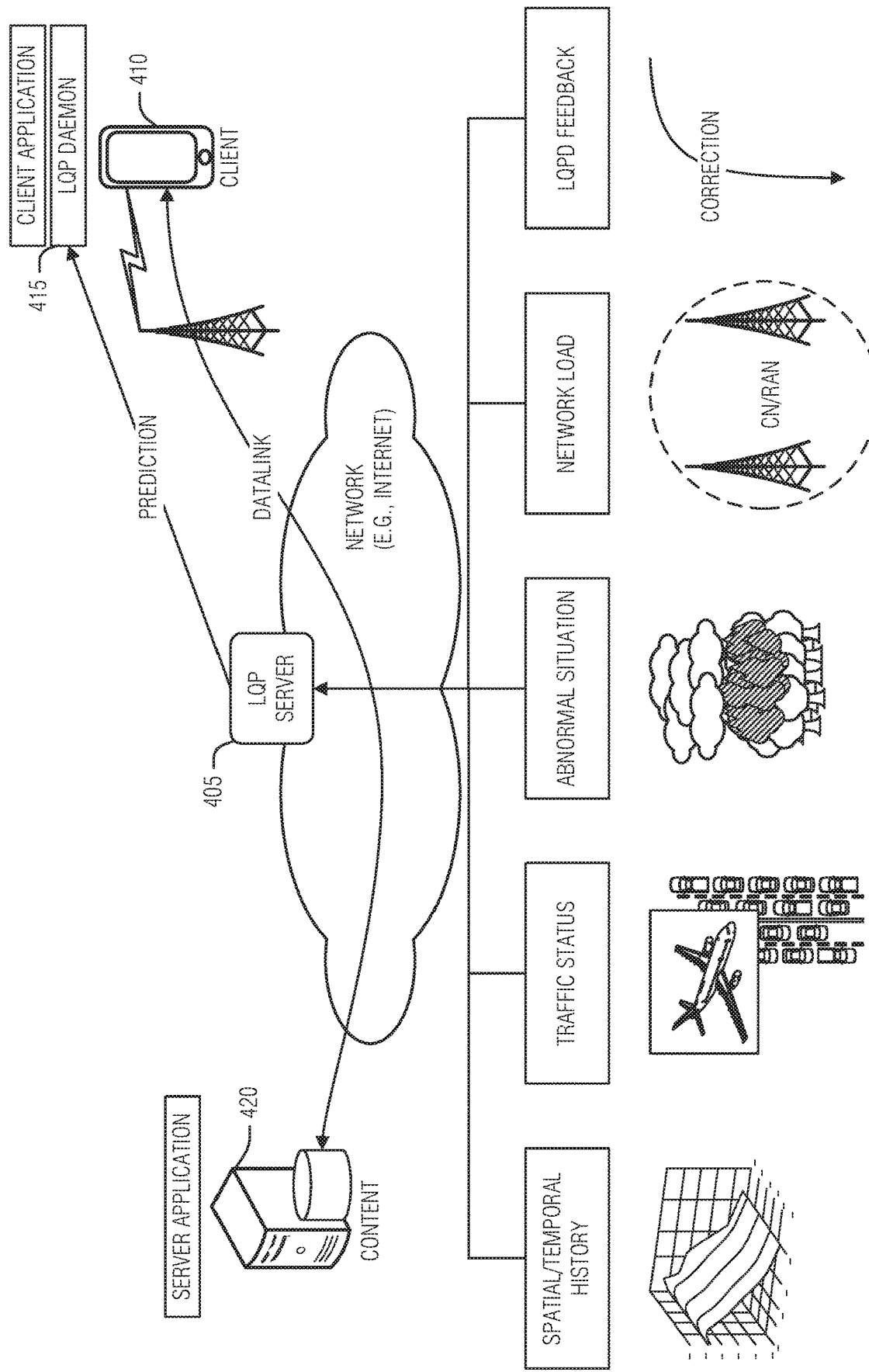
FIG. 4 illustrates an example of communications between components for radio link quality prediction, according to an embodiment.

FIG. 4 illustrates an example of communications between components for radio link quality prediction, according to an embodiment. The illustrated communication improves current RAN/CN (Core Network) based technologies, reducing 5G coverage challenges. Current state data may be collected by the LQP server 405. Current state data may include: local or global RAN/CN state (e.g., network load), environmental data external to RAN/CN (e.g., abnormal situations such as a fire, blizzard, etc.), or traffic. The current state data may also include service provider enforced weights. These weights may signal which base stations that the provider prefers the client 410 to use, or which services are available at what times (e.g., during rush hour). For example, if the client 410 requests to download a larger file, the server signals "avoid this base station and use this other base station at a later time" via the weight. Thus, the provider weights may govern link or base station use, may limit types of traffic (e.g., backups or gameplay), or may encourage connection to particular capabilities (e.g., a 5G base station is preferred for data over a 3G base station).

The current state data may be augmented by prediction correction. feedback (e.g., LQPP feedback) in which difference between actual circumstances are measured against what was predicted. This may be used to train artificial intelligence in an ongoing basis.

Historical or static properties of the radio links may also be gathered. These may include spatial or temporal radio link histories, RAN/CN capabilities (e.g., 3G, 4G, or 5G base stations), coverage maps, transmission (TX) power, backhaul connectivity, etc. These properties may also include environment features, such as roads, physical radio blocks (e.g., trees, hills, mountains, etc.).

After collecting the data, the LQP server 405 processes the data to create predictions of future radio link characteristics, such as bandwidth, latency, TX power, etc. The present prediction may be provided to a number of different entities. For example, the LQPP protocol may be used directly by applications of the service provider 420 or the client 410 to receive the LQP from the LQP Server 405. In an example, a client 410 Link Quality Prediction Demon 415 (LQPd) may implement the LQP server 405, or connect to the LQP server 405 to provide a local interface to client applications (or content provider server applications when installed on the server 420). In an example, the client 410 or the content provider 420 may use a sideband—e.g., not through the LQP server 405—data link to communicate LQP information.

Figure 5:
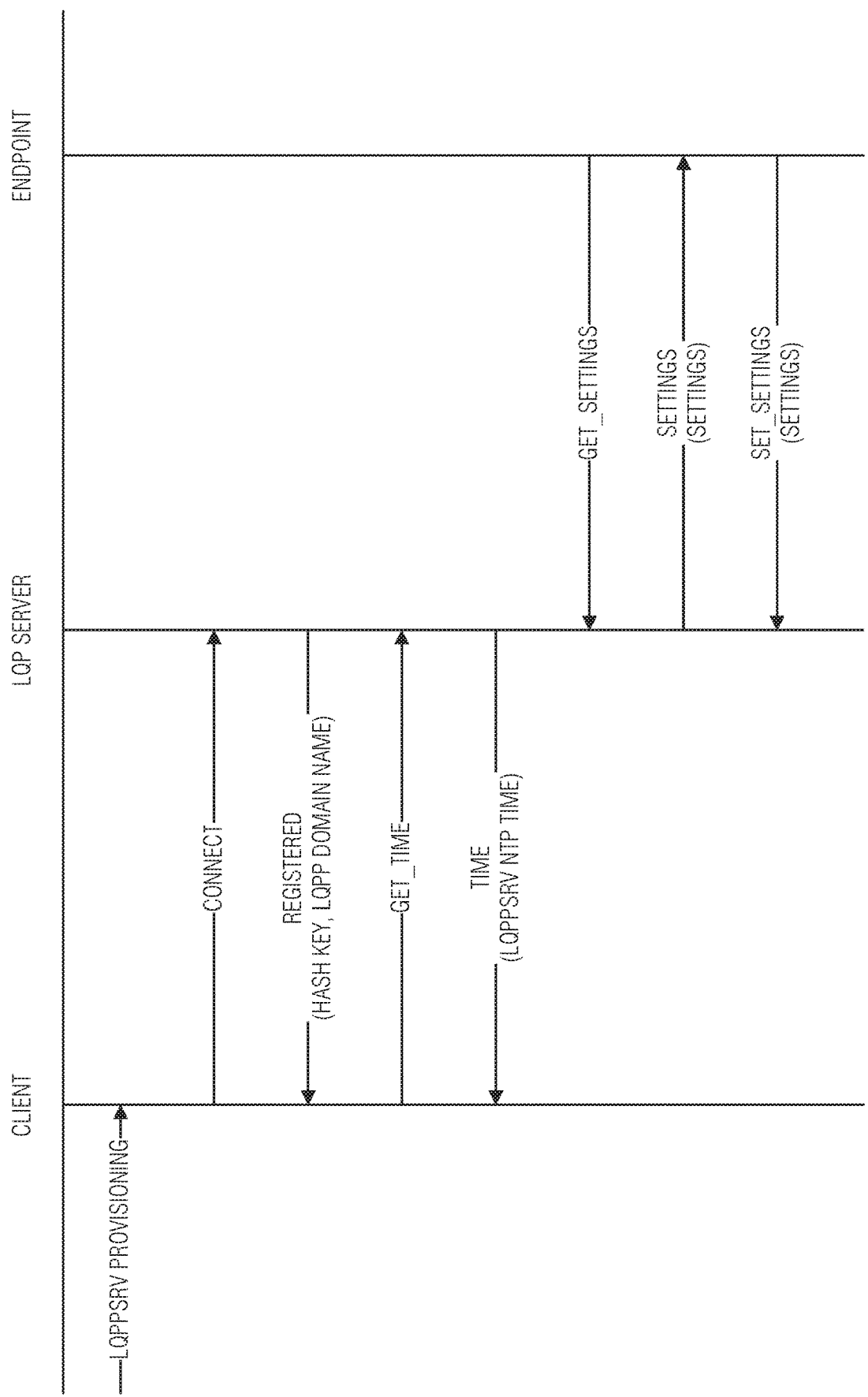
FIG. 5 illustrates a swim lane diagram of an example of registering a device to receive radio link quality prediction information, according to an embodiment.

FIG. 5 illustrates a swim lane diagram of an example of registering a device to receive radio link quality prediction information, according to an embodiment. In an example, all connections to the LQP server are secured, for example, using encryption (e.g., secure sockets layer (SSL) or other symmetric or asymmetric encryption techniques). The client starts LQP provisioning and then connects to the LQP server. The LQP server registers the client, which may include validating the client. During the registration, the LQP server may provision a number of elements to identify the client, or a client session, such as a hash key or LQPP domain name. This provisioning may occur through any of the standard provisioning techniques, such as through policy decision point (PDP) or dynamic host configuration protocol (DHCP). In an example, the domain name is not externally accessible. Once provisioned, the client receives a hash key from the LQPP server that serves as a handle for the connection. In an example, the key is sufficiently sized to ensure that device may guess the key in reasonable time. In an example, a new key is issued at regular intervals to increase security. The client also receives the domain name to the LQPP server that will serve the client, which may be different from the original provisioned server. Further, as time is important in synchronizing predictions and behavior, the client may synchronize with the LQP server.

The endpoint (e.g., a content provider) may also perform a set-up with the LQP server. Here, settings, such as authorization, data formats, etc. may be exchanged.

Figure 6:
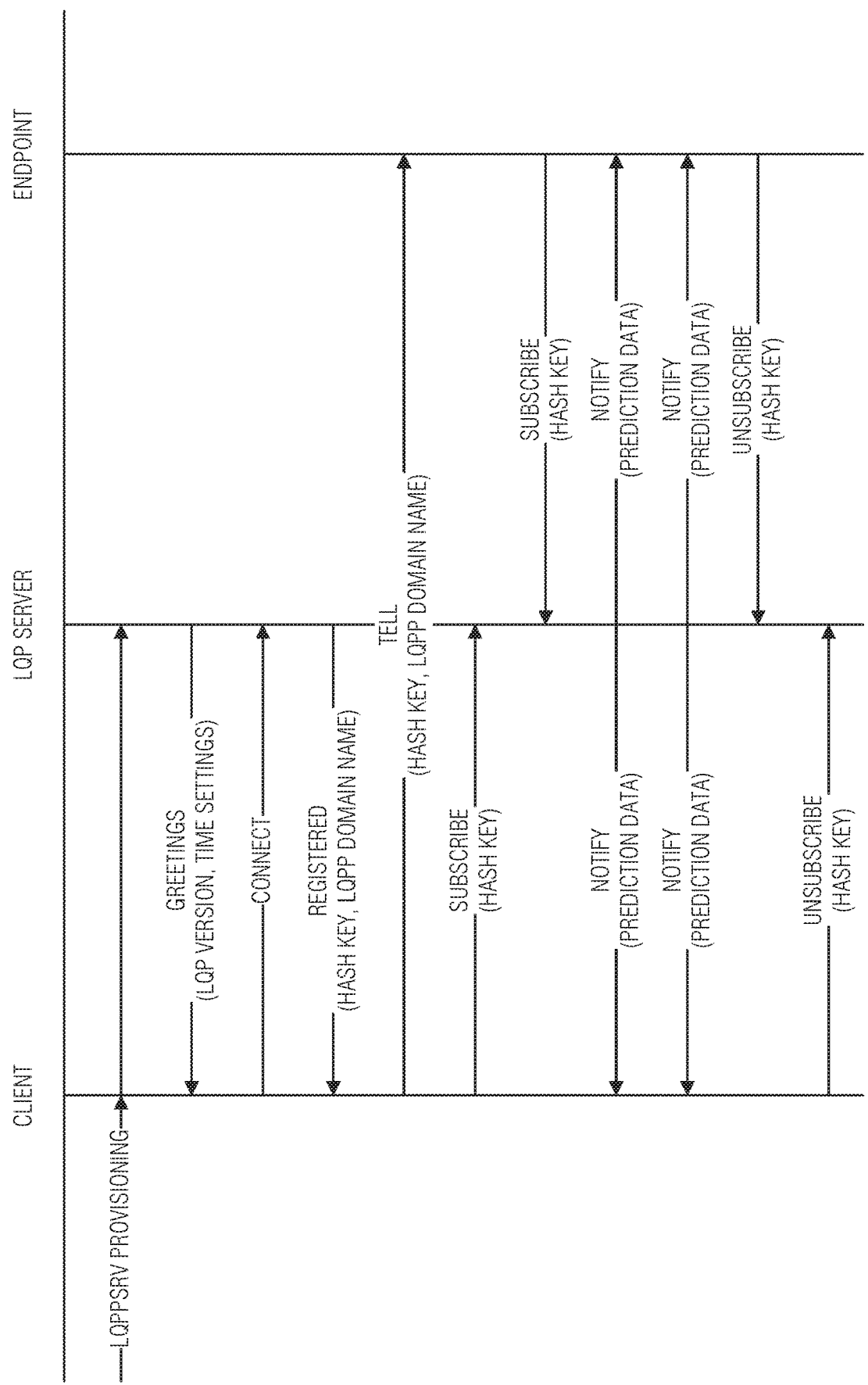
FIG. 6 illustrates a swim lane diagram of an example of a publish-subscribe protocol to receive radio link quality prediction information, according to an embodiment.

FIG. 6 illustrates a swim lane diagram of an example of a publish-subscribe protocol to receive radio link quality prediction information, according to an embodiment. The setup described above with respect to FIG. 5 may occur and then the client may pass the hash key and domain name to the endpoint. This hash key is used by the endpoint to subscribe to the LQP server and receives published updates in accordance with the subscription. Similarly, the client may also subscribe for push notification updates of the predictions. The subscribe, or notify, sequence is driven by the LQPP server and provides updates to subscribers as the quality predictions are updated.

Figure 7:
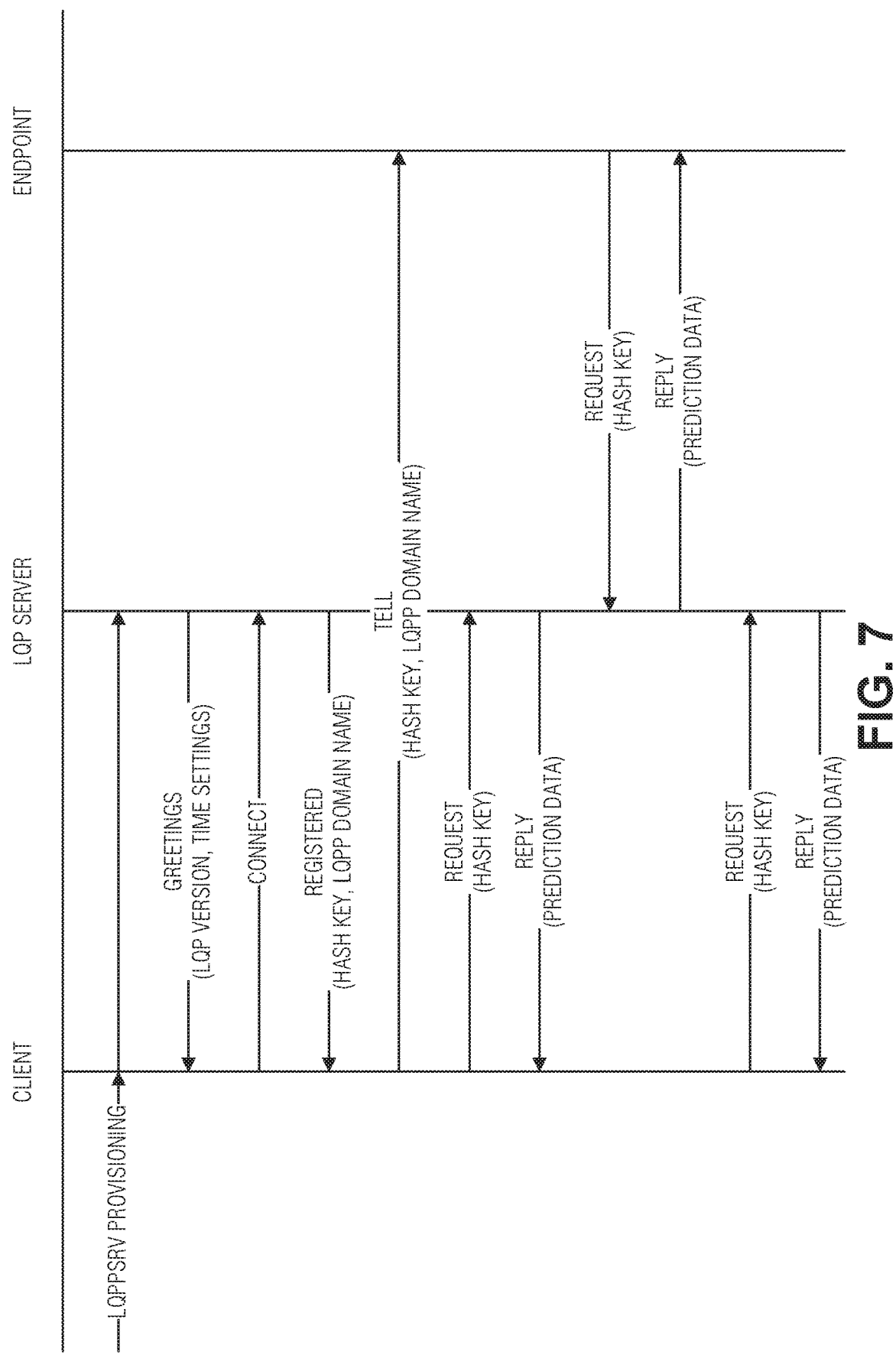
FIG. 7 illustrates a swim lane diagram of an example of a request-response protocol to receive radio link quality prediction information, according to an embodiment.

FIG. 7 illustrates a swim lane diagram of an example of a request-response protocol to receive radio link quality prediction information, according to an embodiment. The setup described above with respect to FIG. 5 may occur and then the client may pass the hash key and domain name to the endpoint. This hash key is used by the endpoint to specify predictions for the client when making requests. Because the client provides the hash key to the endpoint, simple possession of the hash key validates the request for that data to the LQP server. The request-reply protocol is driven by the client and the endpoint, and is most suitable to obtaining infrequent predictions (e.g., to determine if it is appropriate to use a link). In an example, the LQPP server is not required to calculate a new prediction if the requests are spaced too closely in time. Thus, predictions may be calculated only when a request is made, as long as the request is beyond a minimum time threshold. Again, for infrequent requests, this may be more efficient than the publish-subscribe model described above.

Figure 8:
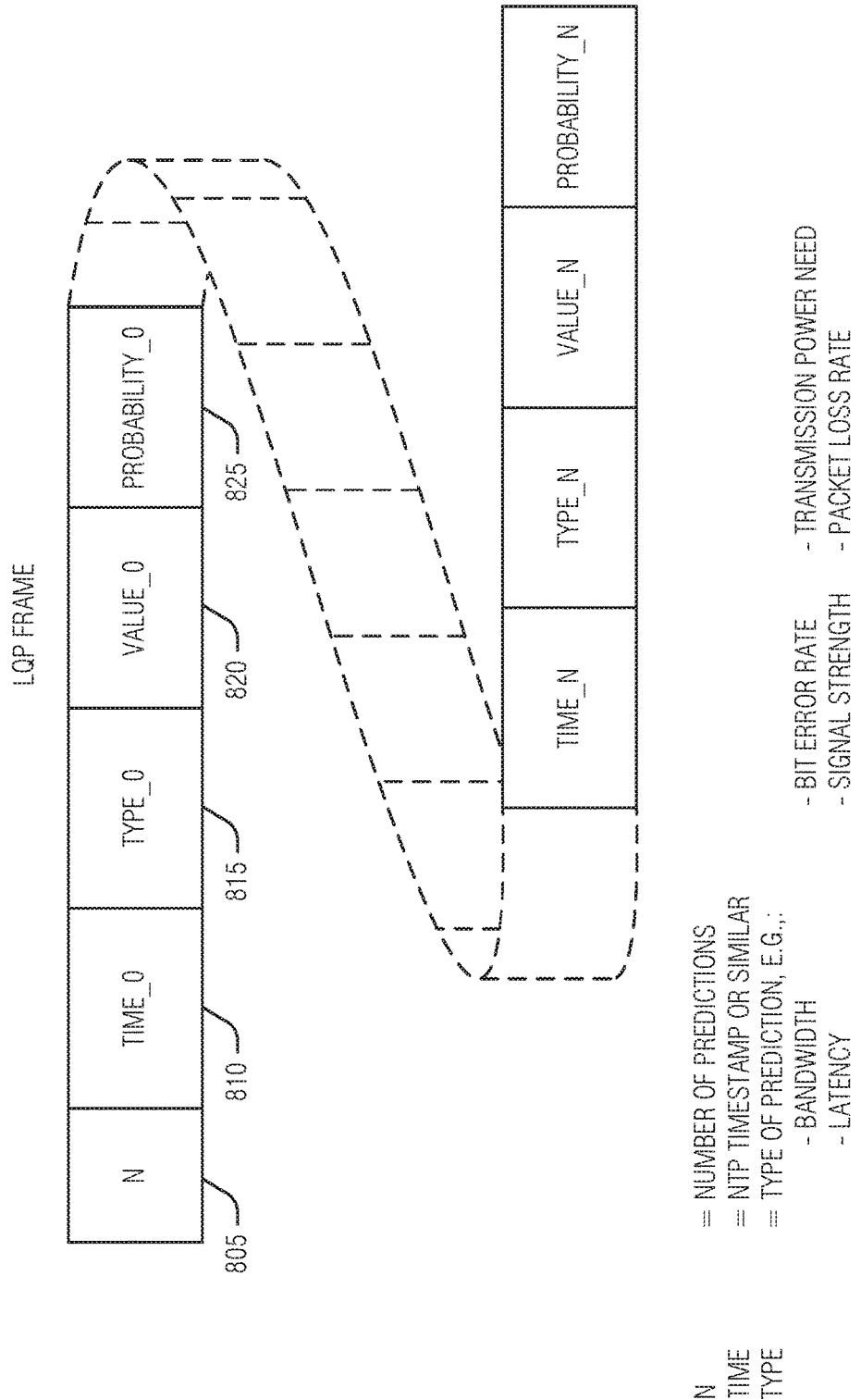
FIG. 8 illustrates an example of a link quality prediction frame, according to an embodiment.

FIG. 8 illustrates an example of a link quality prediction frame 800, according to an embodiment. The LQP protocol may use the LQP frame 800 data structure to communicate LQPs to clients or endpoints. The frame 800 may have more than one prediction for a device. The number of predictions may be signaled by the count field 805, which is not repeated in the frame 800. Each prediction may include a time field 810 (e.g. in 32-bit or 64-bit NTP format or similar), that may, in an example, have millisecond resolution. A prediction may also have a type of prediction metric field 815 that indicates what is being predicted. Example types may include bandwidth, latency, bit-error rate, signal strength, TX power, or packet loss rate, among others. The prediction may have a value field 820 and also, in an example, a probability field 825. The probability field 825, when present, includes a. numerical (e.g., between 0 and 1) value indicating the probability that the value field 820 is correct. The additional predictions may include different types for a same time (e.g., the latency and bandwidth at noon), the same type at different times, or a combination thereof.

Figure 9:
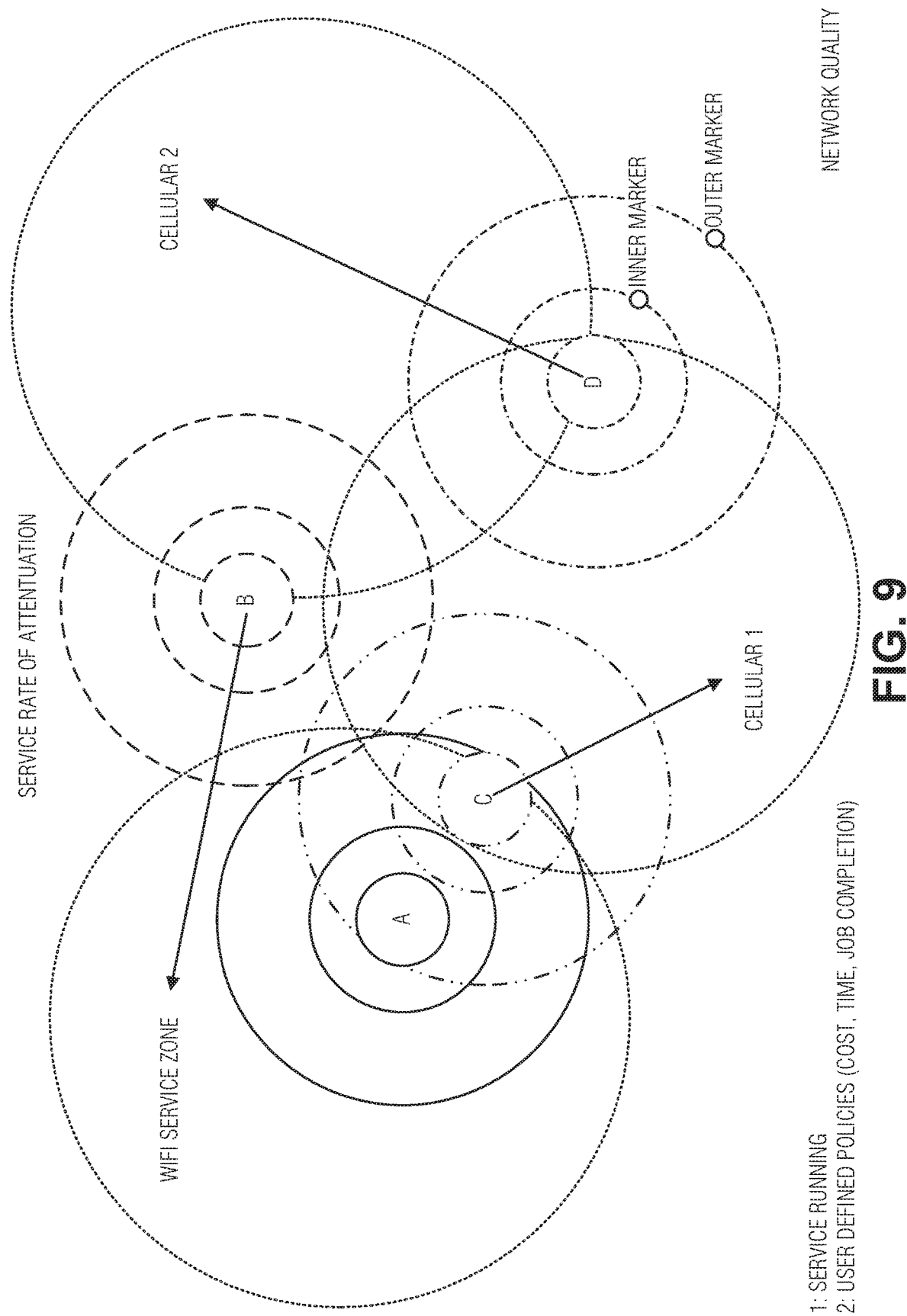
FIG. 9 illustrates an example a attenuation, according to an embodiment.

FIG. 9 illustrates an example of service rate of attenuation, according to an embodiment. Managing the service rate of attenuation—an event that occurs when a radio client (e.g., UE) is moving away from a connectivity source (e.g., base station or access point) and the signal strength decreases to the point where a service disconnect is probable—is an example of using the LQP techniques described above. Using service rate of attenuation, a prediction of an imminent disconnect may be made, taking into consideration the rate of approach or departure of the moving device, the direction of travel, etc. Interfaces or alerts may key off of the prediction to enable for the graceful management, quiescing, or shutdown of running services in order to ensure proper operation of resources and full awareness of connected things about connectivity related events which may interrupt, disrupt or stop services. An aspect may include connection management between networks, understanding of policies of connection and operation within different networks (e.g., based on network access and/or cost policies), etc., to enhance the management of Service Rate Attenuation.

FIG. 9 illustrates an overview on the different service attenuation scenarios across networks or within the same network. As the device reaches the coverage border (e.g., edge of cellular network cell), the network quality degrades. As the device moves from network to network, the link throughput (e.g., service quality impact) varies (e.g., moving from a cellular network to an IEEE 802.11 network may degrade throughput). As illustrated, the size of the arrows, as well as the vector/direction of movement in and out of various networks, indicates rates of departure. The letters, A, B, C and D denote service centers of operation, such as base stations, access points, etc. Often the service centers of operation include the nominal operational SLA for that service center. The illustrated inner and outer markers are described below.

Figure 10:
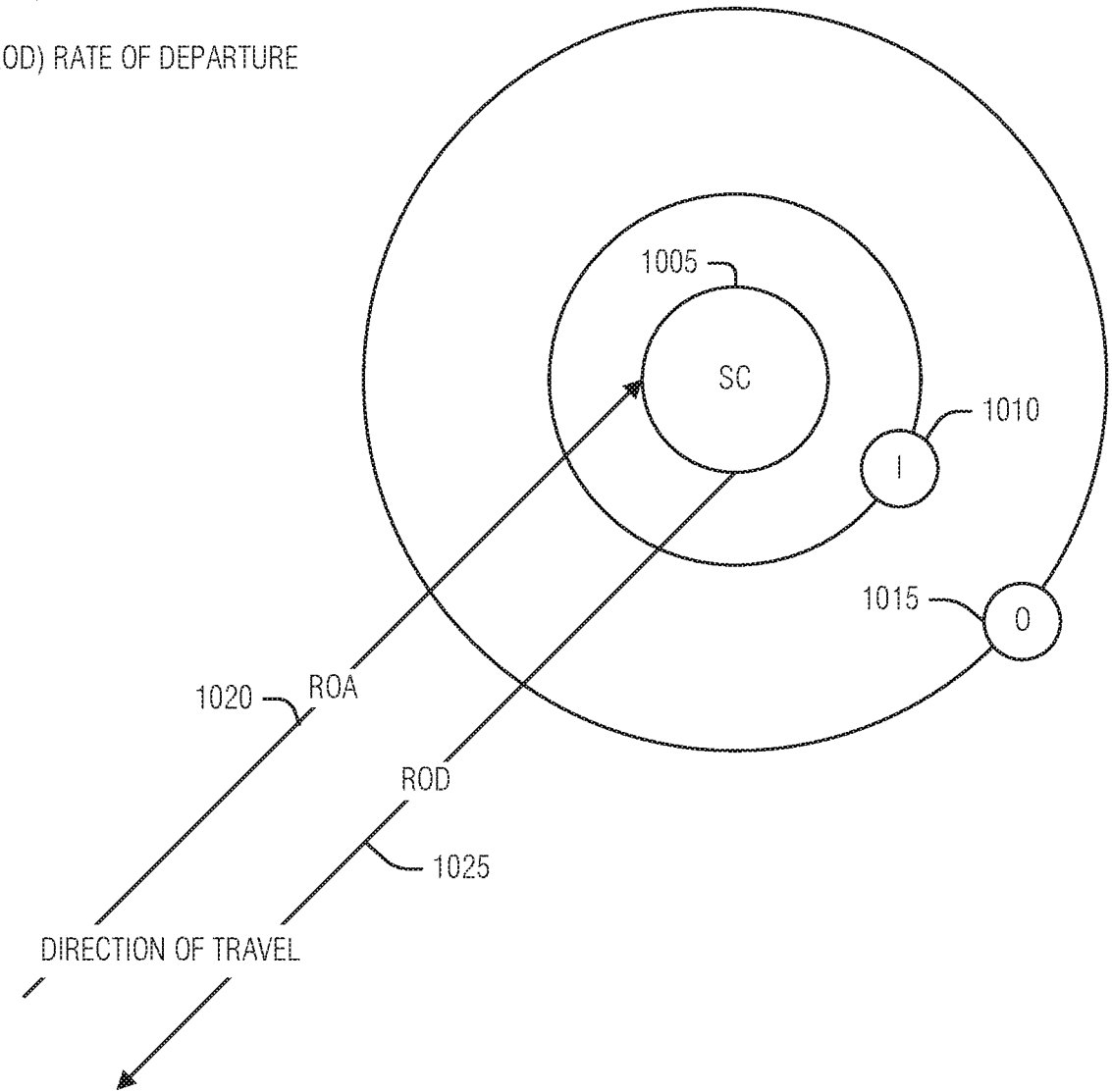
FIG. 10 illustrates service rate of attenuation for a single radio provider, according to an embodiment.

FIG. 10 illustrates service rate of attenuation for a single radio provider, according to an embodiment. Several aspects of the service center of operation 1005 and the inner and outer markers are illustrated in FIG. 10. In broad terms, the service center of operation 1005 employs the inner marker 1010 and the outer marker 1015 to measure the rate at which the moving device accessing (e.g., running, executing, etc.) the various services of the service center of operation is approaching 1020, or departing 1025, the next network or a potential outage. When the device reaches the outer marker 1015, it signals the beginning of an event. When the inner marker 1010 is reached, the service center of operation 1005 calculates the urgency of an impending failure and predicts the event (e.g., outage) timing and the potential for SLA disruption. When the service center of operation 1005 is reached, the event has immediate impact on the service and outage or transfer interrupt is imminent.

Figure 11:
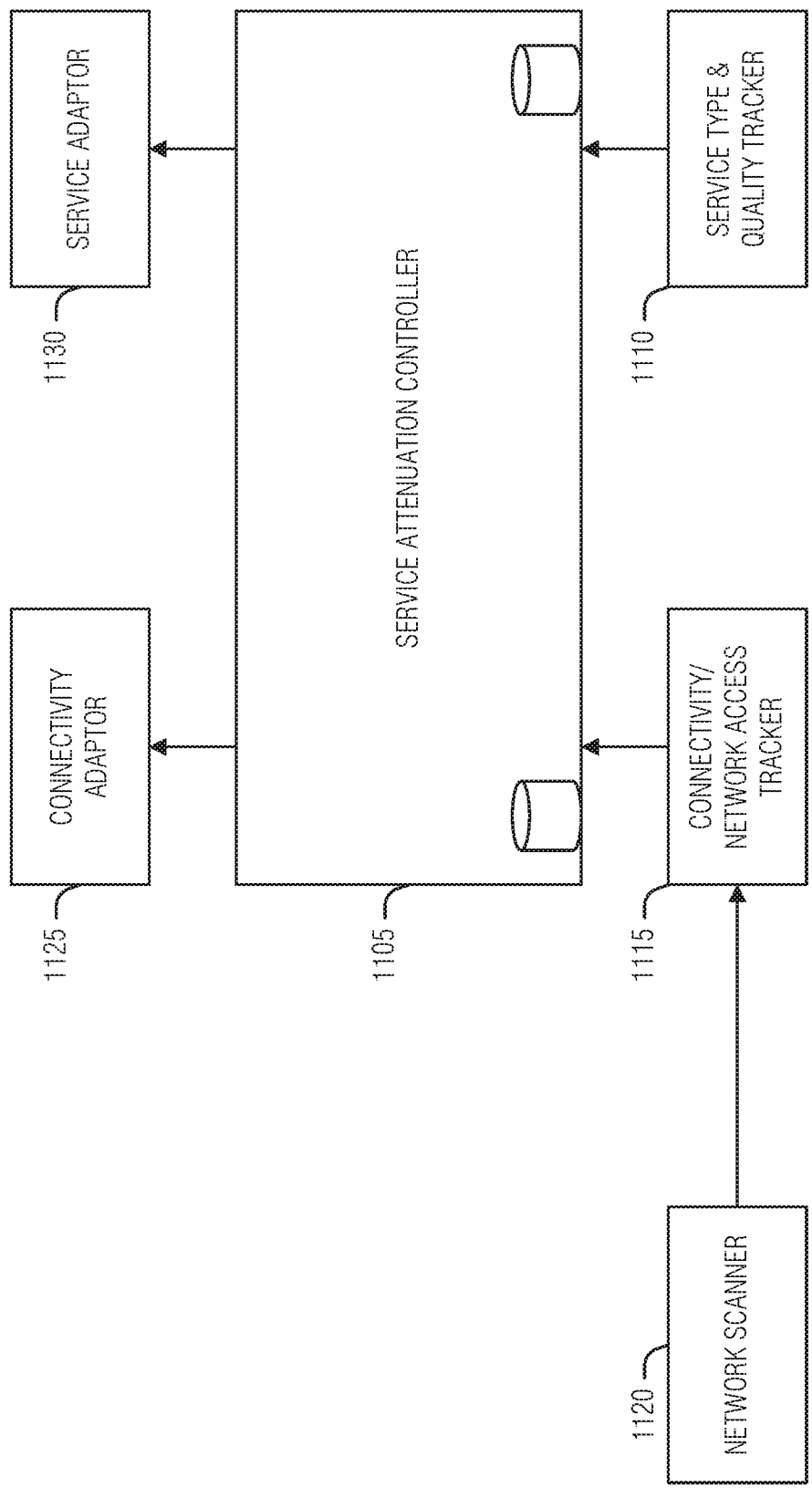
FIG. 11 illustrates an example of a system to perform radio link quality prediction using service rate of attenuation, according to an embodiment.

FIG. 11 illustrates an example of a system to perform radio link quality prediction using service rate of attenuation, according to an embodiment. The system may be employed in a variety of installations, such as IoT Connected Devices accessing diverse services with different SLAs and from diverse types of networks (e.g., wearable devices receiving software updates, a navigation system in a vehicle receiving maps updates, drone transmitting real-time video streams for surveillance, industrial robot in oil/gas areas receiving remote control commands, etc.). The system may include a network scanner 1120. The network scanner 1120 may scan all detectable or available networks regardless of access. This data may be relayed to the Connectivity/Network Access Tracker 1115.

The Connectivity/Network Access Tracker 1115 may continuously measure the signal strength and other quality of service (QoS) elements of the active network interface and uses a Signal Strength/Directional Probe feature to measure the status of the signal strength considering the current and next location of the device within each network zone. This may then be correlated to the policy and cost of the service being consumed or forecasted to be consumed. as the resource moves into a network.

The Service Type & Quality Tracker 1110 may continuously track the active services and their SLAs through meta-data associated with the service packets or through consulting a database at the first initiation of the service. In an example, the SLA is set at the time of service initiation in accordance with the policies of the service. The Service Type & Quality Tracker 1110 may continuously compare the current and the required SLA level.

The Service Attenuation Controller (SAC) 1105 may employ the inner and outer markers to measure the rate at which the device accessing the various services are approaching the next network or a potential outage. When the outer marker is reached, the SAC 1105 initiates an event. When the inner marker is reached, the SAC 1105 calculates an urgency for the event and predicts the event timing and the potential SLA disruption. When SLA is expected to be violated, the SAC 1105 controls either the continuity of the service by changing the network (e.g., forced horizontal roaming within the same network type or forced vertical roaming to a different network type) or gracefully suspending, stopping, or otherwise modifying the service (e.g., based on the service cost, user's preference, etc.) to cope with the network conditions. This may involve maintaining a resume point for the service, allowing the service to be brought back when network conditions improve.

The Connectivity Adaptor 1125 is triggered by the Service Attenuation Controller 1105 to do perform either horizontal or vertical roaming for the device.

The Service Adaptor 1130 is triggered by the Service Attenuation Controller 1130 to pause, suspend, stop, or otherwise modify the service. The Service Adaptor 1130 may also create or save the resume point, such as a number of downloaded bits for an over-the-air update, allowing a resume request to indicate unreceived bits to the service). This trigger or notification from the Service Attenuation Controller 1105 may also be based on the time calculation between the outer and inner markers in a network zone to anticipate when service attenuation will occur.

Figure 12:
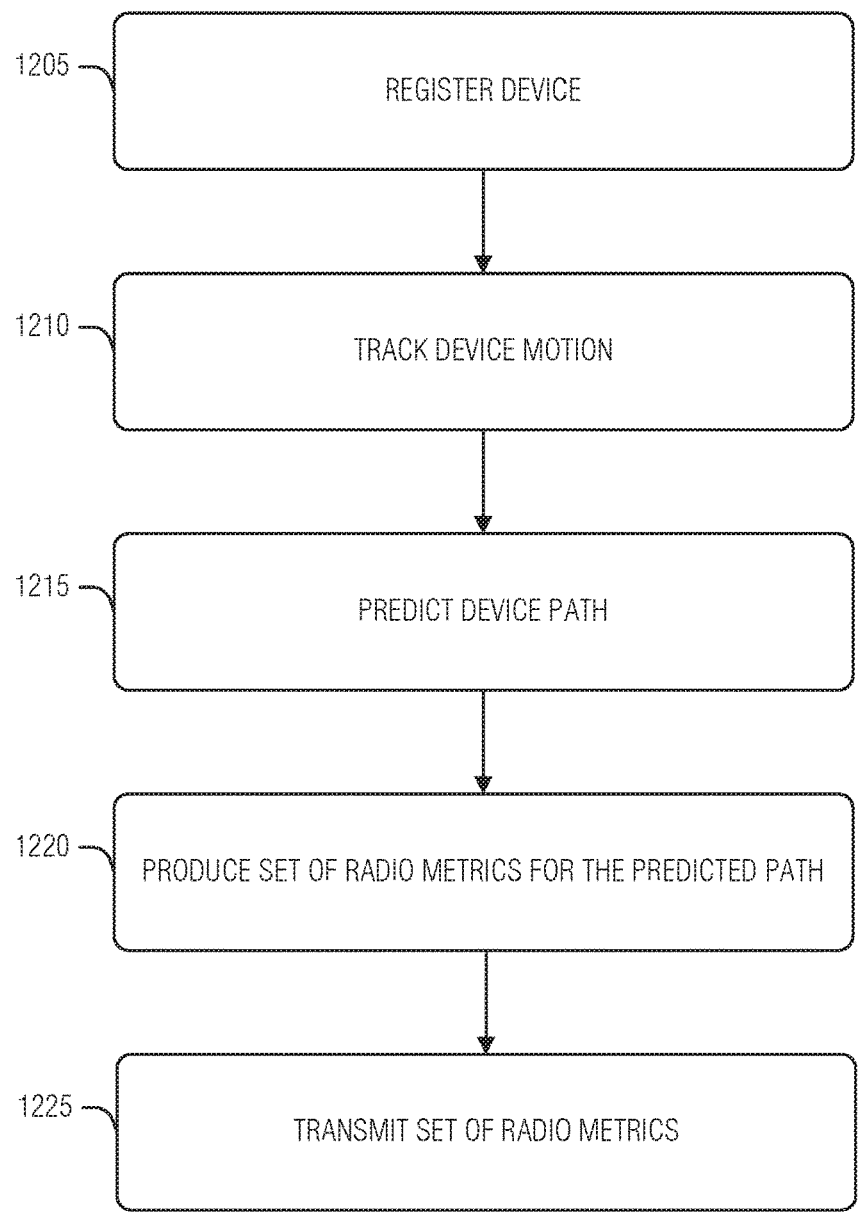
FIG. 12 illustrates a flow diagram of an example of a method for radio link quality prediction, according to an embodiment.

FIG. 12 illustrates a flow diagram of an example of a method 1200 for radio link quality prediction, according to an embodiment. The operations of the method 1200 are performed using electronic hardware, such as that described herein (e.g., processing circuitry).

At operation 1205, a device registration for a mobile device may be received. In an example, receiving the device registration includes receiving a device contact, creating a device record in response to the device contact, creating an identifier for the device record, and transmitting the identifier to the device to complete the registration. In an example, the identifier is anonymized.

At operation 1210, motion data for the mobile device may be obtained. In an example, obtaining the motion data includes at least one of receiving a status update from the mobile device or receiving an update from a cellular network with respect to the mobile device. In an example, the status update includes a geographic coordinate obtained from at least one of a satellite positioning service or a network location service.

At operation 1215, a predicted path for the mobile device may be produced. In an example, producing the predicted path includes obtaining a set of routes and matching the mobile device to a subset of routes in the set of routes based on the motion data. In an example, matching the mobile device to the subset of routes includes providing a trained classifier a set of environmental conditions and the motion data. Output of the trained classifier may then be used to identify the subset of routes. In an example, the environmental data includes the set of routes and at least one of weather, a construction notification, or a traffic notification.

In an example, the trained classifier is at least one of an artificial neural network or an expert system. In an example, the output of the trained classifier is a probability for each route in the set of routes. In an example, using the output of the trained classifier to identify the subset of routes includes selecting each route with a probability greater than a threshold in the subset of routes. In an example, using the output of the trained classifier to identify the subset of routes includes selecting a fixed number of routes with the greatest probabilities to be the subset of routes.

The subset of routes may be ordered. The highest order route may be selected from the subset of routes as the predicted path.

At operation 1220, a set of predicted radio metrics may be produced for the mobile device along the predicted path via a dynamic coverage map. In an example, a radio metric in the set of predicted radio metrics is at least one of a bandwidth, latency, transmission power, or available link technology.

The operations of the method 1200 may be extended to include obtaining a base map—the base map including radio network entities, modifying the base map into a coverage map with radio coverage information for the radio network entities, and updating the coverage map with real-time environmental data to create the dynamic coverage map. In an example, producing the set of predicted radio metrics for the mobile device along the predicted path via a dynamic coverage map includes demarcating radio transmission areas along the predicted path using the dynamic coverage map, segmenting the predicted path using the radio transmission areas, and creating a member for the set of predicted radio metrics, the member including radio transmission metrics for each segment obtained from the dynamic coverage map, and a transition metric. In an example, the transition metric is at least one of a begin time. or an end time. In an example, the transition metric is a geographic coordinate.

At operation 1225, the set of predicted radio metrics may be transmitted (e.g., to the device or to another entity such as a content provider).

In an example, the operations of the method 1200 are performed by a link-quality-prediction (LQP) device. In an example, the LQP device is integrated into the mobile device. In an example, the LQP device is remote from the mobile device. Here, the mobile device communicates with the LQP device using an LQP protocol. In an example, the LQP protocol includes a time synchronization between the LQP device and the mobile device. In an example, the LQP protocol includes a request-response communication paradigm. In an example, the LQP protocol includes a publish-subscribe communication protocol. In an example, the mobile device subscribes to the set of predicted radio metrics and the LQP device pushes the set of predicted radio metrics to the mobile device when there is a change in the set of predicted radio metrics.

In an example, the mobile device uses the set of predicted radio metrics to modify its behavior. In an example, modifying its behavior includes at least one of notifying a user that coverage will cease before coverage ceases, or notifying a user that coverage will resume before coverage resumes. In an example, modifying its behavior includes requesting a content provider send more data than is currently being sent in anticipation of a coverage degradation. In an example, modifying its behavior includes gracefully shutting down network services in anticipation of coverage degradation.

In an example, the operations of the method 1200 are performed by an attenuation controller. In an example, the attenuation controller receives radio network data from a connectivity-network access tracker. In an example, the connectivity-network access tracker receives raw radio network data from a network scanner. In an example, the attenuation controller receives service data from a service type and quality tracker, the service data including information about a service level agreement (SLA) for the service.

In an example, the attenuation controller provides attenuation output to a connectivity adaptor. In an example, the connectivity adaptor provides horizontal or vertical roaming.

In an example, the attenuation controller provides attenuation output to a service adaptor. In an example, the service adaptor controls a service to at least one of pause or stop.

In an example, the attenuation controller establishes an inner and an outer marker for a radio coverage area. In an example, a radio device at the inner marker has better coverage than at the outer marker. In an example, the attenuation controller provides a trigger to at least one of a service adapter or a connectivity adapter in response to the mobile device crossing the inner marker or the outer marker.

Figure 13:
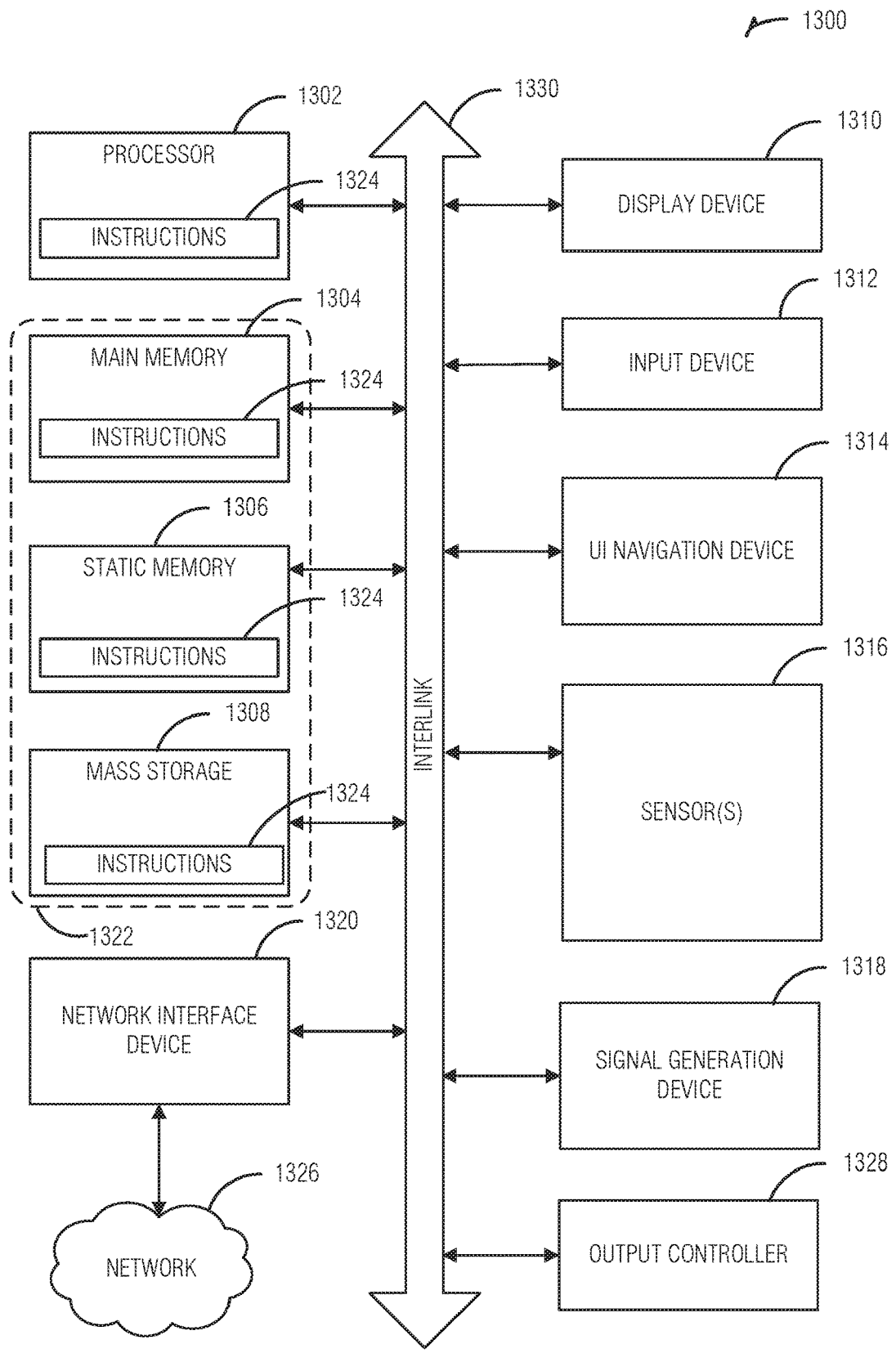
FIG. 13 is a block diagram illustrating an example of a machine upon which one or more embodiments may be implemented.

FIG. 13 illustrates a block diagram of an example machine 1300 upon which any one or more of the techniques (e.g., methodologies) discussed herein may perform. Examples, as described herein, may include, or may operate by, logic or a number of components, or mechanisms in the machine 1300. Circuitry (e.g., processing circuitry) is a collection of circuits implemented in tangible entities of the machine 1300 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1300 follow.

In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1300 may include a hardware processor 1302 (e.g., a central processing unit (CPU), a graphics processing unit (GPU), a hardware processor core, or any combination thereof), a main memory 1304, a static memory (e.g., memory or storage for firmware, microcode, a basic-input-output (BIOS), unified extensible firmware interface (UEFI), etc.) 1306, and mass storage 1308 (e.g., hard drive, tape drive, flash storage, or other block devices) some or all of which may communicate with each other via an interlink (e.g., bus) 1330. The machine 1300 may further include a display unit 1310 (e.g., a monitor implemented in e-ink, light-emitting diode (LED), liquid crystal display (LCD) of varying resolutions and size, such as from a 4K 70 inch 32-bit color display to a 1 inch, 1-20 character monochrome display), an alphanumeric input device 1312 (e.g., a keyboard, a 10-key input, a 12-key input, etc.), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1308, a signal generation device 1318 (e.g., a speaker), a network interface device 1320, and one or more sensors 1316, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1302, the main memory 1304, the static memory 1306, or the mass storage 1308 may be, or include, a machine readable medium 1322 on which is stored one or more sets of data structures or instructions 1324 (e.g., software) embodying or utilized by any one or more of the techniques or functions described herein. The instructions 1324 may also reside, completely or at least partially, within any of registers of the processor 1302, the main memory 1304, the static memory 1306, or the mass storage 1308 during execution thereof by the machine 1300. In an example, one or any combination of the hardware processor 1302, the main memory 1304, the static memory 1306, or the mass storage 1308 may constitute the machine readable media 1322. While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may be further transmitted or received over a communications network 1326 using a transmission medium via the network interface device 1320 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software. A transmission medium is a machine readable medium.

Additional Notes & Examples

Example 1 is an apparatus for link quality predictions, the apparatus comprising: computer readable media including instructions; and process circuitry that, when in operation, is configured by the instructions to: receive a device registration for a mobile device; obtain motion data for the mobile device in response to the device registration; produce a predicted path for the mobile device based on the motion data; produce a set of predicted radio metrics for the mobile device along the predicted path via a dynamic coverage map; and transmit the set of predicted radio metrics.

In Example 2, the subject matter of Example 1 includes, wherein, to receive the device registration, the processing circuitry: receives a device contact; creates a device record in response to the device contact; creates an identifier for the device record; and transmits the identifier to the device to complete the device registration.

In Example 3, the subject matter of Example 2 includes, wherein the identifier is anonymized.

In Example 4, the subject matter of Examples 1-3 includes, wherein, to obtain the motion data for the mobile device, the processing circuitry at least one of receives a status update from the mobile device or receives an update from a cellular network with respect to the mobile device.

In Example 5, the subject matter of Example 4 includes, wherein the status update includes a geographic coordinate obtained from at least one of a satellite positioning service or a network location service.

In Example 6, the subject matter of Examples 1-5 includes, wherein, to produce the predicted path, the processing circuitry: obtains a set of routes; matches the mobile device to a subset of routes in the set of routes based on the motion data; orders the subset of routes; and selects a highest order route from the subset of routes as the predicted path.

In Example 7, the subject matter of Example 6 includes, wherein, to match the mobile device to the subset of routes, the processing circuitry: provides a set of environmental conditions data to a trained classifier; provides the motion data to the trained classifier; and uses output of the trained, classifier to identify the subset of routes.

In Example 8, the subject matter of Example 7 includes, wherein the environmental conditions data includes the set of routes and at least one of a weather notification, a construction notification, or a traffic notification.

In Example 9, the subject matter of Examples 7-8 includes, wherein the trained classifier is at least one of an artificial neural network or an expert system.

In Example 10, the subject matter of Examples 7-9 includes, wherein the output of the trained classifier is a probability for each route in the set of routes.

In Example 11, the subject matter of Example 10 includes, wherein, to use the output of the trained classifier to identify the subset of routes, the processing circuitry selects each route with a probability greater than a threshold in the subset of routes.

In Example 12, the subject matter of Examples 10-11 includes, wherein, to use the output of the trained classifier to identify the subset of routes, the processing circuitry selects a fixed number of routes with the greatest probabilities to be the subset of routes.

In Example 13, the subject matter of Examples 1-12 includes, wherein the instructions configured the processing circuitry to: obtain a base map, the base map including radio network entities; modify the base map into a coverage map with radio coverage information for the radio network entities; and update the coverage map with real-time environmental data to create the dynamic coverage map.

In Example 14, the subject matter of Example 13 includes, wherein, to produce the set of predicted radio metrics for the mobile device along the predicted path via a dynamic coverage map, the processing circuitry: demarcates radio transmission areas along the predicted path using the dynamic coverage map; segments the predicted path using the radio transmission areas; and creates a member for the set of predicted radio metrics, the member including radio transmission metrics for each segment obtained from the dynamic coverage map, and a transition metric.

In Example 15, the subject matter of Example 14 includes, wherein the transition metric is at least one of a begin time or an end time.

In Example 16, the subject matter of Examples 14-15 includes, wherein the transition metric is a geographic coordinate.

In Example 17, the subject matter of Examples 1-16 includes, wherein a radio metric in the set of predicted radio metrics indicates at least one of bandwidth, latency, transmission power, or available link technology.

In Example 18, the subject matter of Examples 1-17 includes, wherein the apparatus is part of a link-quality-prediction (LQP) device.

In Example 19, the subject matter of Example 18 includes, wherein the LQP device is integrated into the mobile device.

In Example 20, the subject matter of Examples 18-19 includes, wherein the LQP device is remote from the mobile device, and wherein the mobile device communicates with the LQP device using an LQP protocol.

In Example 21, the subject matter of Example 20 includes, wherein the LQP protocol includes a time synchronization between the LQP device and the mobile device.

In Example 22, the subject matter of Examples 20-21 includes, wherein the LQP protocol includes a request-response communication paradigm.

In Example 23, the subject matter of Examples 20-22 includes, wherein the LQP protocol includes a publish-subscribe communication protocol.

In Example 24, the subject matter of Example 23 includes, wherein the mobile device subscribes to the set of predicted radio metrics and the LQP device transmits the set of predicted radio metrics to the mobile device in response to a change in the set of predicted radio metrics.

In Example 25, the subject matter of Examples 18-24 includes, wherein the mobile device uses the set of predicted radio metrics to modify behavior of the mobile device.

In Example 26, the subject matter of Example 25 includes, wherein modifying the behavior includes at least one of notifying a user that coverage will cease before coverage ceases, or notifying a user that coverage will resume before coverage resumes.

In Example 27, the subject matter of Examples 25-26 includes, wherein modifying the behavior includes requesting a content provider send more data, than is currently being sent in anticipation of a coverage degradation.

In Example 28, the subject matter of Examples 25-27 includes, wherein modifying the behavior includes gracefully shutting down network services in anticipation of coverage degradation.

In Example 29, the subject matter of Examples 1-28 includes, wherein the apparatus is part of an attenuation controller.

In Example 30, the subject matter of Example 29 includes, wherein the attenuation controller receives radio network data from a connectivity-network access tracker.

In Example 31, the subject matter of Example 30 includes, wherein the connectivity-network access tracker receives raw radio network data from a network scanner.

In Example 32, the subject matter of Examples 29-31 includes, wherein the attenuation controller receives service data from a service type and quality tracker, the service data including information about a service level agreement (SLA) for the service.

In Example 33, the subject matter of Examples 29-32 includes, wherein the attenuation controller provides attenuation output to a connectivity adaptor.

In Example 34, the subject matter of Example 33 includes, wherein the connectivity adaptor provides horizontal or vertical roaming.

In Example 35, the subject matter of Examples 29-34 includes, wherein the attenuation controller provides attenuation output to a service adaptor.

In Example 36, the subject matter of Example 35 includes, wherein the service adaptor controls a service to at least one of pause or stop.

In Example 37, the subject matter of Examples 29-36 includes, wherein the attenuation controller establishes an inner and an outer marker for a radio coverage area.

In Example 38, the subject matter of Example 37 includes, wherein a radio device located at the inner marker has better coverage than at the outer marker.

In Example 39, the subject matter of Example 38 includes, wherein the attenuation controller provides a trigger to at least one of a service adapter or a connectivity adapter in response to the mobile device crossing the inner marker or the outer marker.

Example 40 is a method for link quality predictions, the method comprising: receiving a device registration for a mobile device; obtaining motion data for the mobile device in response to the device registration; producing a predicted path for the mobile device based on the motion data; producing a set of predicted radio metrics for the mobile device along the predicted path via a dynamic coverage map; and transmitting the set of predicted radio metrics.

In Example 41, the subject matter of Example 40 includes, wherein receiving the device registration includes: receiving a device contact; creating a device record in response to the device contact; creating an identifier for the device record; and transmitting the identifier to the device to complete the device registration.

In Example 42, the subject matter of Example 41 includes, wherein the identifier is anonymized.

In Example 43, the subject matter of Examples 40-42 includes, wherein obtaining the motion data for the mobile device includes at least one of: receiving a status update from the mobile device, or receiving an update from a cellular network with respect to the mobile device.

In Example 44, the subject matter of Example 43 includes, wherein the status update includes a geographic coordinate obtained from at least one of a satellite positioning service or a network location. service.

In Example 45, the subject matter of Examples 40-44 includes, wherein producing the predicted path includes: obtaining a set of routes; matching the mobile device to a subset of routes in the set of routes based on the motion data; ordering the subset of routes; and selecting a highest order route from the subset of routes as the predicted path.

In Example 46, the subject matter of Example 45 includes, wherein matching the mobile device to the subset of routes includes: providing a set of environmental conditions data to a trained classifier; providing the motion data to the trained classifier; and using output of the trained classifier to identify he subset of routes.

In Example 47, the subject matter of Example 46 includes, wherein the environmental conditions data includes the set of routes and at least one of a weather notification, a construction notification, or a traffic notification.

In Example 48, the subject matter of Examples 46-47 includes, wherein the trained classifier is at least one of an artificial neural network or an expert system.

In Example 49, the subject matter of Examples 46-48 includes, wherein the output of the trained classifier is a probability for each route in the set of routes.

In Example 50, the subject matter of Example 49 includes, wherein using the output of the trained classifier to identify the subset of routes includes selecting each route with a probability greater than a threshold in the subset of routes.

In Example 51, the subject matter of Examples 49-50 includes, wherein using the output of the trained classifier to identify the subset of routes includes selecting a fixed number of routes with the greatest probabilities to be the subset of routes.

In Example 52, the subject matter of Examples 40-51 includes, creating the dynamic coverage map including: obtaining a base map, the base map including radio network entities; modifying the base map into a coverage map with radio coverage information for the radio network entities; and updating the coverage map with real-time environmental data to create the dynamic coverage map.

In Example 53, the subject matter of Example 52 includes, wherein producing the set of predicted radio metrics for the mobile device along the predicted path via a dynamic coverage map includes: demarcating radio transmission areas along the predicted path using the dynamic coverage map; segmenting the predicted path using the radio transmission areas; and creating a member for the set of predicted radio metrics, the member including radio transmission metrics for each segment obtained from the dynamic coverage map, and a transition metric.

In Example 54, the subject matter of Example 53 includes, wherein the transition metric is at least one of a begin time or an end time.

In Example 55, the subject matter of Examples 53-54 includes, wherein the transition metric is a geographic coordinate.

In Example 56, the subject matter of Examples 40-55 includes, wherein a radio metric in the set of predicted radio metrics indicates at least one of bandwidth, latency, transmission power, or available link technology.

In Example 57, the subject matter of Examples 40-56 includes, wherein the operations of the method are performed by a link-quality-prediction (LQP) device.

In Example 58, the subject matter of Example 57 includes, wherein the LQP device is integrated into the mobile device.

In Example 59, the subject matter of Examples 57-58 includes, wherein the LQP device is remote from the mobile device, and wherein the mobile device communicates with the LQP device using an LQP protocol.

In Example 60, the subject matter of Example 59 includes, wherein the LQP protocol includes a time synchronization between the LQP device and the mobile device.

In Example 61, the subject matter of Examples 59-60 includes, wherein the LQP protocol includes a request-response communication paradigm.

In Example 62, the subject matter of Examples 59-61 includes, wherein the LQP protocol includes a publish-subscribe communication protocol.

In Example 63, the subject matter of Example 62 includes, wherein the mobile device subscribes to the set of predicted radio metrics and the LQP device transmits the set of predicted radio metrics to the mobile device in response to a change in the set of predicted radio metrics.

In Example 64, the subject matter of Examples 57-63 includes, wherein the mobile device uses the set of predicted radio metrics to modify behavior of the mobile device.

In Example 65, the subject matter of Example 64 includes, wherein modifying the behavior includes at least one of notifying a user that coverage will cease before coverage ceases, or notifying a user that coverage will resume before coverage resumes.

In Example 66, the subject matter of Examples 64-65 includes, wherein modifying the behavior includes requesting a content provider send more data than is currently being sent in anticipation of a coverage degradation.

In Example 67, the subject matter of Examples 64-66 includes, wherein modifying the behavior includes gracefully shutting down network services in anticipation of coverage degradation.

In Example 68, the subject matter of Examples 40-67 includes, wherein the operations of the method are performed by an attenuation controller.

In Example 69, the subject matter of Example 68 includes, wherein the attenuation controller receives radio network data from a connectivity-network access tracker.

In Example 70, the subject matter of Example 69 includes, wherein the connectivity-network access tracker receives raw radio network data from a network scanner.

In Example 71, the subject matter of Examples 68-70 includes, wherein the attenuation controller receives service data from a service type and quality tracker, the service data including information about a service level agreement (SLA) for the service.

In Example 72, the subject matter of Examples 68-71 includes, wherein the attenuation controller provides attenuation output to a connectivity adaptor.

In Example 73, the subject matter of Example 72 includes, wherein the connectivity adaptor provides horizontal or vertical roaming.

In Example 74, the subject matter of Examples 68-73 includes, wherein the attenuation controller provides attenuation output to a service adaptor.

In Example 75, the subject matter of Example 74 includes, wherein the service adaptor controls a service to at least one of pause or stop.

In Example 76, the subject matter of Examples 68-75 includes, wherein the attenuation controller establishes an inner and an outer marker for a radio coverage area.

In Example 77, the subject matter of Example 76 includes, wherein a radio device located at the inner marker has better coverage than at the outer marker.

In Example 78, the subject matter of Example 77 includes, wherein the attenuation controller provides a trigger to at least one of a service adapter or a connectivity adapter in response to the mobile device crossing the inner marker or the outer marker.

Example 79 is at least one machine readable medium including instructions that, when executed by processing circuitry, cause the processing circuitry to perform any method of Examples 40-78.

Example 80 is a system comprising means to perform any method of Examples 40-78.

Example 81 is at least one computer readable medium including instructions for link quality predictions, the instructions, when executed by processing circuitry, causing the processing circuitry to perform operations comprising: receiving a device registration for a mobile device; obtaining motion data for the mobile device in response to the device registration; producing a predicted path for the mobile device based on the motion data; producing a set of predicted radio metrics for the mobile device along the predicted path via a dynamic coverage map; and transmitting the set of predicted radio metrics.

In Example 82, the subject matter of Example 81 includes, wherein receiving the device registration includes: receiving a device contact; creating a device record in response to the device contact; creating an identifier for the device record; and transmitting the identifier to the device to complete the device registration.

In Example 83, the subject matter of Example 82 includes, wherein the identifier is anonymized.

In Example 84, the subject matter of Examples 81-83 includes, wherein obtaining the motion data for the mobile device includes at least one of receiving a status update from the mobile device or receiving an update from a cellular network with respect to the mobile device.

In Example 85, the subject matter of Example 84 includes, wherein the status update includes a geographic coordinate obtained from at least one of a satellite positioning service or a network location service.

In Example 86, the subject matter of Examples 81-85 includes, wherein producing the predicted path includes: obtaining a set of routes; matching the mobile device to a subset of routes in the set of routes based on the motion data; ordering the subset of routes; and selecting a highest order route from the subset of routes as the predicted path.

In Example 87, the subject matter of Example 86 includes, wherein matching the mobile device to the subset of routes includes: providing a set of environmental conditions data to a trained classifier; providing the motion data to the trained classifier; and using output of the trained classifier to identify the subset of routes.

In Example 88, the subject matter of Example 87 includes, wherein the environmental conditions data includes the set of routes and at least one of a weather notification, a construction notification, or a traffic notification.

In Example 89, the subject matter of Examples 87-88 includes, wherein the trained classifier is at least one of an artificial neural network or an expert system.

In Example 90, the subject matter of Examples 87-89 includes, wherein the output of the trained classifier is a probability for each route in the set of routes.

In Example 91, the subject matter of Example 90 includes, wherein using the output of the trained classifier to identify the subset of routes includes selecting each route with a probability greater than a threshold in the subset of routes.

In Example 92, the subject matter of Examples 90-91 includes, wherein using the output of the trained classifier to identify the subset of routes includes selecting a fixed number of routes with the greatest probabilities to be the subset of routes.

In Example 93, the subject matter of Examples 81-92 includes, wherein the operations further comprise creating the dynamic coverage map including: obtaining a base map, the base map including radio network entities; modifying the base map into a coverage map with radio coverage information for the radio network entities; and updating the coverage map with real-time environmental data to create the dynamic coverage map.

In Example 94, the subject matter of Example 93 includes, wherein producing the set of predicted radio metrics for the mobile device along the predicted path via a dynamic coverage map includes: demarcating radio transmission areas along the predicted path using the dynamic coverage map; segmenting the predicted path using the radio transmission areas; and creating a member for the set of predicted radio metrics, the member including radio transmission metrics for each segment obtained from the dynamic coverage map, and a transition metric.

In Example 95, the subject matter of Example 94 includes, wherein the transition metric is at least one of a begin time or an end time.

In Example 96, the subject matter of Examples 94-95 includes, wherein the transition metric is a geographic coordinate.

In Example 97, the subject matter of Examples 81-96 includes, wherein a radio metric in the set of predicted radio metrics indicates at least one of bandwidth, latency, transmission power, or available link technology.

In Example 98, the subject matter of Examples 81-97 includes, wherein the processing circuitry is in a link-quality-prediction (LQP) device.

In Example 99, the subject matter of Example 98 includes, wherein the LQP device is integrated into the mobile device.

In Example 100, the subject matter of Examples 98-99 includes, wherein the LQP device is remote from the mobile device, and wherein the mobile device communicates with the LQP device using an LQP protocol.

In Example 101 the subject matter of Example 100 includes, wherein the LQP protocol includes a time synchronization between the LQP device and the mobile device.

In Example 102, the subject matter of Examples 100-101 includes, wherein the LQP protocol includes a request-response communication paradigm.

In Example 103, the subject matter of Examples 100-102 includes, wherein the LQP protocol includes a publish-subscribe communication protocol.

In Example 104, the subject matter of Example 103 includes, wherein the mobile device subscribes to the set of predicted radio metrics and the LQP device transmits the set of predicted radio metrics to the mobile device in response to a change in the set of predicted radio metrics.

In Example 105, the subject matter of Examples 98-104 includes, wherein the mobile device uses the set of predicted radio metrics to modify behavior of the mobile device.

In Example 106, the subject matter of Example 105 includes, wherein modifying the behavior includes at least one of notifying a user that coverage will cease before coverage ceases, or notifying a user that coverage will resume before coverage resumes.

In Example 107, the subject matter of Examples 105-106 includes, wherein modifying the behavior includes requesting a content provider send more data than is currently being sent in anticipation of a coverage degradation.

In Example 108, the subject matter of Examples 105-107 includes, wherein modifying the behavior includes gracefully shutting down network services in anticipation of coverage degradation.

In Example 109, the subject matter of Examples 81-108 includes, wherein the processing circuitry is in an attenuation controller.

In Example 110, the subject matter of Example 109 includes, wherein the attenuation controller receives radio network data from a connectivity-network access tracker.

In Example 111 the subject matter of Example 110 includes, wherein the connectivity-network access tracker receives raw radio network data from a network scanner.

In Example 112, the subject matter of Examples 109-111 includes, wherein the attenuation controller receives service data from a service type and quality tracker, the service data including information about a service level agreement (SLA) for the service.

In Example 113, the subject matter of Examples 109-112 includes, wherein the attenuation controller provides attenuation output to a connectivity adaptor.

In Example 114, the subject matter of Example 113 includes, wherein the connectivity adaptor provides horizontal or vertical roaming.

In Example 115, the subject matter of Examples 109-116 includes, wherein the attenuation controller provides attenuation output to a service adaptor.

In Example 116, the subject matter of Example 115 includes, wherein the service adaptor controls a service to at least one of pause or stop.

In Example 117, the subject matter of Examples 109-116 includes, wherein the attenuation controller establishes an inner and an outer marker for a radio coverage area.

In Example 118, the subject matter of Example 117 includes, wherein a radio device located at the inner marker has better coverage than at the outer marker.

In Example 119, the subject matter of Example 118 includes, wherein the attenuation controller provides a trigger to at least one of a service adapter or a connectivity adapter in response to the mobile device crossing the inner marker or the outer marker.

Example 120 is a system for link quality predictions, the system comprising: means for receiving a device registration for a mobile device; means for obtaining motion data for the mobile device in response to the device registration; means for producing a predicted path for the mobile device based on the motion data.; means for producing a set of predicted radio metrics for the mobile device along the predicted path via a dynamic coverage map; and means for transmitting the set of predicted radio metrics.

In Example 121, the subject matter of Example 120 includes, wherein the means for receiving the device registration include: means for receiving a device contact; means for creating a device record in response to the device contact; means for creating an identifier for the device record; and means for transmitting the identifier to the device to complete the device registration.

In Example 122, the subject matter of Example 121 includes, wherein the identifier is anonymized.

In Example 123, the subject matter of Examples 120-122 includes, wherein the means for obtaining the motion data for the mobile device include means for at least one of receiving a status update from the mobile device or receiving an update from a cellular network with respect to the mobile device.

In Example 124, the subject matter of Example 123 includes, wherein the status update includes a geographic coordinate obtained from at least one of a satellite positioning service or a network location service.

In Example 125, the subject matter of Examples 120-124 includes, wherein the means for producing the predicted path include: means for obtaining a set of routes; means for matching the mobile device to a subset of routes in the set of routes based on the motion data; means for ordering the subset of routes; and means for selecting a highest order route from the subset of routes as the predicted path.

In Example 126, the subject matter of Example 125 includes, wherein the means for matching the mobile device to the subset of routes include: means for providing a set of environmental conditions data to a trained classifier; means for providing the motion data to the trained classifier; and means for using output of the trained classifier to identify the subset of routes.

In Example 127, the subject matter of Example 126 includes, wherein the environmental conditions data includes the set of routes and at least one of a weather notification, a construction notification, or a traffic notification.

In Example 128, the subject matter of Examples 126-127 includes, wherein the trained classifier is at least one of an artificial neural network or an expert system.

In Example 129, the subject matter of Examples 126-128 includes, wherein the output of the trained classifier is a probability for each route in the set of routes.

In Example 130, the subject matter of Example 129 includes, wherein the means for using the output of the trained classifier to identify the subset of routes include means for selecting each route with a probability greater than a threshold in the subset of routes.

In Example 131, the subject matter of Examples 129-130 includes, wherein the means for using the output of the trained classifier to identify the subset of routes include means for selecting a fixed number of routes with the greatest probabilities to be the subset of routes.

In Example 132, the subject matter of Examples 120-131 includes, means for creating the dynamic coverage map including: means for obtaining a base map, the base map including radio network entities; means for modifying the base map into a coverage map with radio coverage information for the radio network entities; and means for updating the coverage map with real-time environmental data to create the dynamic coverage map.

In Example 133, the subject matter of Example 132 includes, wherein the means for producing the set of predicted radio metrics for the mobile device along the predicted path via a dynamic coverage map include: means for demarcating radio transmission areas along the predicted path using the dynamic coverage map; means for segmenting the predicted path using the radio transmission areas; and means for creating a member for the set of predicted radio metrics, the member including radio transmission metrics for each segment obtained from the dynamic coverage map, and a transition metric.

In Example 134, the subject matter of Example 133 includes, wherein the transition metric is at least one of a begin time or an end time.

In Example 135, the subject matter of Examples 133-134 includes, wherein the transition metric is a geographic coordinate.

In Example 136, the subject matter of Examples 120-135 includes, wherein a radio metric in the set of predicted radio metrics indicates at least one of bandwidth, latency, transmission power, or available link technology.

In Example 137, the subject matter of Examples 120-136 includes, wherein the system is in a link-quality-prediction (LQP) device.

In Example 138, the subject matter of Example 137 includes, wherein the LQP device is integrated into the mobile device.

In Example 139, the subject matter of Examples 137-138 includes, wherein the LQP device is remote from the mobile device, and wherein the mobile device communicates with the LQP device using an LQP protocol.

In Example 140, the subject matter of Example 139 includes, wherein the LQP protocol includes a time synchronization between the LQP device and the mobile device.

In Example 141, the subject matter of Examples 139-140 includes, wherein the LQP protocol includes a request-response communication paradigm.

In Example 142, the subject matter of Examples 139-141 includes, wherein the LQP protocol includes a publish-subscribe communication protocol.

In Example 143, the subject matter of Example 142 includes, wherein the mobile device subscribes to the set of predicted radio metrics and the LQP device transmits the set of predicted radio metrics to the mobile device in response to a change in the set of predicted radio metrics.

In Example 144, the subject matter of Examples 137-143 includes, wherein the mobile device uses the set of predicted radio metrics to modify behavior of the mobile device.

In Example 145, the subject matter of Example 144 includes, wherein modifying the behavior includes at least one of notifying a user that coverage will cease before coverage ceases, or notifying a user that coverage will resume before coverage resumes.

In Example 146, the subject matter of Examples 144-145 includes, wherein modifying the behavior includes requesting a content provider send more data than is currently being sent in anticipation of a coverage degradation.

In Example 147, the subject matter of Examples 144-146 includes, wherein modifying the behavior includes gracefully shutting down network services in anticipation of coverage degradation.

In Example 148, the subject matter of Examples 120-147 includes, wherein the system is in an attenuation controller.

In Example 149, the subject matter of Example 148 includes, wherein the attenuation controller receives radio network data from a connectivity-network access tracker.

In Example 150, the subject matter of Example 149 includes, wherein the connectivity-network access tracker receives raw radio network data from a network scanner.

In Example 151, the subject matter of Examples 143-150 includes, wherein the attenuation controller receives service data from a service type and quality tracker, the service data including information about a service level agreement (SLA) for the service.

In Example 152, the subject matter of Examples 148-151 includes, wherein the attenuation controller provides attenuation output to a connectivity adaptor.

In Example 153, the subject matter of Example 152 includes, wherein the connectivity adaptor provides horizontal or vertical roaming.

In Example 154, the subject matter of Examples 148-153 includes, wherein the attenuation controller provides attenuation output to a service adaptor.

In Example 155, the subject matter of Example 154 includes, wherein the service adaptor controls a service to at least one of pause or stop.

In Example 156, the subject matter of Examples 148-155 includes, wherein the attenuation controller establishes an inner and an outer marker for a radio coverage area.

In Example 157, the subject matter of Example 156 includes, wherein a radio device located at the inner marker has better coverage than at the outer marker.

In Example 158, the subject matter of Example 157 includes, wherein the attenuation controller provides a trigger to at least one of a service adapter or a connectivity adapter in response to the mobile device crossing the inner marker or the outer marker.

Example 159 is a device fog adapted to perform the operations of any of Examples 1 to 158.

Example 160 is a cloud service server adapted to perform operations of a cloud service invoked by any of Examples 1 to 158.

Example 161 is an edge computing device adapted to perform the operations of a client device invoked by any of Examples 1 to 158.

Example 162 is a credential management service server adapted to perform the operations of credentialing invoked by any of Examples 1 to 158.

Example 163 is an authentication management service server adapted to perform the operations of authentication invoked by any of Examples 1 to 158.

Example 164 is a device onboarding service server adapted to perform the operations of onboarding invoked by any of Examples 1 to 158.

Example 165 is an Open Connectivity Foundation (OCF) device, configured as a server, client, or intermediary according to an OCF specification, comprising means to implement the operations of any of Examples 1 to 158.

Example 166 is an Internet of Things (IoT) network topology, the IoT network topology comprising respective communication links adapted to perform communications for the operations of any of Examples 1 to 158.

Example 167 is a network comprising respective devices and device communication mediums for performing any of the operations of Examples 1 to 158.

Example 168 is an apparatus comprising means for performing any of the operations of Examples 1 to 158.

Example 169 is a system to perform the operations of any of Examples 1 to 168.

Example 170 is a method to perform the operations of any of Examples 1 to 168.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" d "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus for link quality predictions, the apparatus comprising:

computer readable media including instructions; and processor circuitry that, when in operation, is configured by the instructions to:

receive a device registration for a mobile device, the device registration comprising a device contact for the mobile device;

generate a hash key based on the device registration, the hash key identifying the mobile device;

obtain motion data for the mobile device in response to the device registration, the device registration causing integration of the motion data for a link quality prediction associated with a particular radio link provided between a particular radio station and the mobile device;

produce a predicted path for the mobile device based on the motion data, for usage of the particular radio link;

produce a set of predicted radio metrics to perform the link quality prediction associated with the particular radio link, for predicted usage by the mobile device along the predicted path via a dynamic coverage map, the dynamic coverage map providing future radio link quality estimations across a geographical area including the predicted path; and transmit, to the mobile device and the particular radio station, the set of predicted radio metrics based on subscription requests from the mobile device and the particular radio station for the set of predicted radio metrics, the subscription requests including the hash key, wherein the mobile device uses the set of predicted radio metrics to modify a data communication behavior of the mobile device during use of the particular radio link, and wherein operations to modify the data communication behavior includes operations to cause the mobile device to transmit a request that the particular radio station send more data than is currently being sent in anticipation of a coverage degradation via the particular radio link, and to continue with the modified data communication behavior until the coverage degradation resolves with the particular radio link.

2. The apparatus of claim 1, wherein, to receive the device registration, the processor circuitry:

creates a device record in response to the device contact;

creates an identifier for the device record, the identifier comprising the hash key; and transmits the identifier for the device record to the mobile device to complete the device registration.

3. The apparatus of claim 1, wherein, to obtain the motion data for the mobile device, the processor circuitry receives at least one of:

a status update from the mobile device; or an update from a cellular network with respect to the mobile device.

4. The apparatus of claim 1, wherein, to produce the predicted path, the processor circuitry:

obtains a set of routes;

matches the mobile device to a subset of routes in the set of routes based on the motion data;

orders the subset of routes; and selects a highest order route from the subset of routes as the predicted path.

5. The apparatus of claim 4, wherein, to match the mobile device to the subset of routes, the processor circuitry:

provides a set of environmental conditions data to a trained classifier;

provides the motion data to the trained classifier; and uses output of the trained classifier to identify the subset of routes.

6. The apparatus of claim 5, wherein the environmental conditions data includes the set of routes and at least one of a weather notification, a construction notification, or a traffic notification.

7. The apparatus of claim 1, wherein the apparatus is part of a link-quality-prediction (LQP) device.

8. The apparatus of claim 1, wherein the operations to modify the data communication behavior includes operations to gracefully shut down network services in anticipation of coverage degradation.

9. The apparatus of claim 1, wherein the apparatus is part of an attenuation controller.

10. The apparatus of claim 9, wherein the attenuation controller establishes an inner and an outer marker for a radio coverage area.

11. The apparatus of claim 10, wherein a radio device located at the inner marker has better coverage than at the outer marker.

12. The apparatus of claim 11, wherein the attenuation controller provides a trigger to at least one of a service adapter or a connectivity adapter in response to the mobile device crossing the inner marker or the outer marker.

13. At least one non-transitory computer readable medium including instructions for link quality predictions, the instructions, when executed by processing circuitry, causing the processing circuitry to perform operations comprising:

receiving a device registration for a mobile device, the device registration comprising a device contact for the mobile device;

generating a hash key based on the device registration, the hash key identifying the mobile device;

obtaining motion data for the mobile device in response to the device registration, the device registration causing integration of the motion data for a link quality prediction associated with a particular radio link provided between a particular radio station and the mobile device;

producing a predicted path for the mobile device based on the motion data, for usage of the particular radio link;

producing a set of predicted radio metrics to perform the link quality prediction associated with the particular radio link, for predicted usage by the mobile device along the predicted path via a dynamic coverage map, the dynamic coverage map providing future radio link quality estimations across a geographical area including the predicted path; and transmitting, to the mobile device and the particular radio station, the set of predicted radio metrics based on subscription requests from the mobile device and the particular radio station for the set of predicted radio metrics, the subscription requests including the hash key, wherein the mobile device uses the set of predicted radio metrics to modify a data communication behavior of the mobile device during use of the particular radio link, and wherein operations to modify the data communication behavior includes operations to cause the mobile device to transmit a request that the particular radio station send more data than is currently being sent in anticipation of a coverage degradation via the particular radio link, and to continue with the modified data communication behavior until the coverage degradation resolves with the particular radio link.

14. The computer readable medium of claim 13, wherein receiving the device registration includes:
   creating a device record in response to the device contact;
   creating an identifier for the device record, the identifier comprising the hash key; and
   transmitting the identifier for the device record to the mobile device to complete the device registration.

15. The computer readable medium of claim 13, wherein obtaining the motion data for the mobile device includes at least one of receiving a status update from the mobile device or receiving an update from a cellular network with respect to the mobile device.

16. The computer readable medium of claim 13, wherein producing the predicted path includes:
   obtaining a set of routes;
   matching the mobile device to a subset of routes in the set of routes based on the motion data;
   ordering the subset of routes; and
   selecting a highest order route from the subset of routes as the predicted path.

17. The computer readable medium of claim 16, wherein matching the mobile device to the subset of routes includes:
   providing a set of environmental conditions data to a trained classifier;
   providing the motion data to the trained classifier; and
   using output of the trained classifier to identify the subset of routes.

18. The computer readable medium of claim 17, wherein the environmental conditions data includes the set of routes and at least one of a weather notification, a construction notification, or a traffic notification.

19. The computer readable medium of claim 13, wherein the processing circuitry is in a link-quality-prediction (LOP) device.

20. The computer readable medium of claim 13, wherein operations to modify the data communication behavior includes operations to gracefully shut down network services in anticipation of coverage degradation.

21. The computer readable medium of claim 13, wherein the processing circuitry is in an attenuation controller.

22. The computer readable medium of claim 21, wherein the attenuation controller establishes an inner and an outer marker for a radio coverage area.

23. The computer readable medium of claim 22, wherein a radio device located at the inner marker has better coverage than at the outer marker.

24. The computer readable medium of claim 23, wherein the attenuation controller provides a trigger to at least one of a service adapter or a connectivity adapter in response to the mobile device crossing the inner marker or the outer marker.

* * * * *